US008347216B2

(12) United States Patent
Shin et al.

(10) Patent No.: US 8,347,216 B2
(45) Date of Patent: Jan. 1, 2013

(54) MOBILE TERMINAL AND VIDEO SHARING METHOD THEREOF

(75) Inventors: Hyun-Bin Shin, Seoul (KR); Eun-Woo Cho, Seoul (KR); Young-Soo An, Seoul (KR)

(73) Assignee: LG Electronics Inc., Seoul (KR)

( * ) Notice: Subject to any disclaimer, the term of this patent is extended or adjusted under 35 U.S.C. 154(b) by 522 days.

(21) Appl. No.: 12/570,509

(22) Filed: Sep. 30, 2009

(65) Prior Publication Data

US 2010/0083137 A1 Apr. 1, 2010

(30) Foreign Application Priority Data

Oct. 1, 2008 (KR) .......................... 10-2008-0096834
Oct. 15, 2008 (KR) .......................... 10-2008-0101331

(51) Int. Cl.
*G06F 3/00* (2006.01)
*H04W 4/00* (2009.01)

(52) U.S. Cl. ........ 715/756; 715/750; 715/772; 715/762; 455/422.1; 455/556.1; 455/466

(58) Field of Classification Search .................. 455/416, 455/422.1, 466, 420, 556.1; 715/741, 772, 715/863, 864, 750–758, 762, 769, 720
See application file for complete search history.

(56) References Cited

U.S. PATENT DOCUMENTS

| 5,594,859 | A  | * | 1/1997 | Palmer et al. ................. 715/756 |
| 7,865,834 | B1 | * | 1/2011 | van Os et al. ................. 715/756 |
| 2005/0149876 | A1 | * | 7/2005 | Kortum et al. ................. 715/753 |
| 2005/0160372 | A1 | * | 7/2005 | Gruen et al. ................... 715/810 |
| 2005/0208962 | A1 | * | 9/2005 | Kim ............................ 455/550.1 |
| 2006/0156243 | A1 | * | 7/2006 | Lee et al. ...................... 715/741 |
| 2006/0161872 | A1 | * | 7/2006 | Rytivaara et al. ............. 715/864 |
| 2006/0193448 | A1 | * | 8/2006 | Donoghue et al. ........... 379/67.1 |
| 2006/0198395 | A1 | * | 9/2006 | Lappalainen et al. ........ 370/503 |
| 2007/0081644 | A1 | * | 4/2007 | Jachner .................... 379/106.01 |
| 2007/0115346 | A1 | * | 5/2007 | Kim et al. ................... 348/14.02 |
| 2007/0255785 | A1 | * | 11/2007 | Hayashi et al. ............... 709/204 |
| 2008/0002022 | A1 | * | 1/2008 | VanEpps .......................... 348/22 |
| 2008/0075067 | A1 | * | 3/2008 | Guglielmi et al. ............ 370/352 |
| 2008/0117838 | A1 | * | 5/2008 | Yee et al. ...................... 370/260 |
| 2009/0015653 | A1 | * | 1/2009 | Baek ........................... 348/14.02 |
| 2009/0089683 | A1 | * | 4/2009 | Thapa .......................... 715/756 |
| 2009/0177810 | A1 | * | 7/2009 | Kweon et al. ................... 710/33 |
| 2009/0210814 | A1 | * | 8/2009 | Agrusa et al. ................. 715/772 |
| 2009/0249225 | A1 | * | 10/2009 | Beswick et al. ............... 715/756 |
| 2009/0305688 | A1 | * | 12/2009 | Bonnet et al. ............. 455/422.1 |

* cited by examiner

*Primary Examiner* — Tadeese Hailu
(74) *Attorney, Agent, or Firm* — Birch, Stewart, Kolasch & Birch, LLP

(57) ABSTRACT

A mobile terminal for providing a video sharing function in a multi-party call state and its video sharing method are disclosed. When a video sharing menu is selected while a user is performing individual call communication or multi-party call communication, one or a plurality of video share keys in relation to a user selected for video sharing are displayed, so that the user can select a desired one of the displayed video share keys to share video with the selected user. In addition, a video share authority change key is disposed on the screen of a terminal set as a video share authority (chief authority) change target, so that a corresponding terminal can select the video share authority change key during individual or multi-party video sharing to acquire the authority of video sharing (chief authority) from a terminal currently having the authority of video sharing, thus perform bi-directional video sharing in real time.

22 Claims, 20 Drawing Sheets

MOBILE TERMINAL AND VIDEO SHARING METHOD THEREOF

CROSS REFERENCE TO RELATED APPLICATIONS

The present application claims priority to Korean Application Nos. 10-2008-0096834 filed in Korea on Oct. 1, 2008, and 10-2008-0101331 filed on Oct. 15, 2008, the entire contents of which is hereby incorporated by reference in its entirety.

BACKGROUND OF THE INVENTION

1. Field of the Invention

The present invention relates to a mobile terminal providing a video sharing function in a multi-party call communication state, and its video sharing method.

2. Description of the Related Art

A mobile terminal is a device that can be carried around and has one or more functions such as voice and video call communication, inputting and outputting information, storing data, and the like.

A mobile terminal may be configured to perform diverse functions. Such diverse functions may include a data and voice communication function, a function of capturing a photo image or video through a camera, a voice storage function, a music file reproducing function through a speaker system, an image or video display function, and the like. Some mobile terminals include an additional function allowing playing games, and other mobile terminals are implemented as multimedia players. Recently, mobile terminals allow users to receive broadcast or multicast signals to view video or television programs.

Efforts are ongoing to support and increase the functionality of mobile terminals. Such efforts include software and hardware improvements, as well as changes and improvements in the structural components which form the mobile terminal. Among such functions, a touch function of a mobile terminal allows the user who is not familiar to button/key inputting to conveniently operate the terminal by using a touch screen, taking a hold as an important function of the terminal along with a UI beyond its simple inputting.

Recently, a mobile terminal provide a video sharing call (VSC) function of transmitting a previously stored image or a video signal captured by a camera to a counterpart terminal in real time in a call mode in which a voice signal is transmitted or received. In this case, the mobile terminal uses a real time protocol (RTP) for transmitting voice data and uses a packet data protocol (PDP) for transmitting video data.

Accordingly, the mobile terminal establishes a session (or a call) with another party by using a session initiation protocol (SIP), a signaling protocol, and then performs the VSC function based on an IP allocated from an access point name (APN) of an IP-based multimedia subsystem (IMS) according to the PDP.

However, the VSC function currently provided as an IMS service in the mobile terminal is supported in only one-to-one communication, not in 1:M call communications such as multi-party call communication (or conference call). Thus, if a different call comes to establish another call communication during one-to-one call communication, because the VSC function is not supported for the different user, video sharing is not effectively performed.

SUMMARY OF THE INVENTION

Accordingly, one object of the present invention is to address the above-noted and other problems.

Another object of the present invention is to provide a mobile terminal capable of effectively performing individual and multi-party video sharing in a call communication state, and its video sharing method.

Still another object of the present invention is to provide a mobile terminal capable of effectively performing a video sharing function in a multi-party call state, and its video sharing method.

Yet another object of the present invention is to provide a mobile terminal capable of performing bi-directional video sharing by freely assigning the authority for video sharing in a call communication state, and its video sharing method.

To achieve these and other advantages and in accordance with the purpose of the present invention, as embodied and broadly described herein, the present invention provides in one aspect a mobile terminal including: a memory configured to store information in relation to video sharing; a display unit configured to display information in relation to video sharing and a video shared state; and a controller configured to display at least one or more video share keys in relation to a video sharing user to share video with a desired user according to the displayed video share keys, when video sharing is performed during multi-party call communication.

When video sharing is selected during multi-party call communication, the controller displays items for selecting a user for transmitting video and user information on the display unit, and displays information corresponding to the user selected from the items and a video share key on the display unit.

The video share keys may be consistent with the number of users who want to share video. The video share key may be added or deleted. For example, the video share key may be deleted when it is moved by a certain distance to the left or right through touch-and-dragging or flicking, and may be added in one of upward and downward directions of a video share key currently displayed through menu selection.

The video share key may be set to be automatically deleted when video sharing is terminated.

If the total number of video share keys exceeds a certain number, they are automatically integrated into a single multi-video share key and displayed.

The one or more video share keys may be integrated into a single multi-video share key through a user's touch-and dragging or flicking, so as to be displayed.

To achieve these and other advantages and in accordance with the purpose of the present invention, as embodied and broadly described herein, the present invention provides in another aspect a video sharing method of a mobile terminal, including: performing multi-party call communication with a plurality of users; when video sharing is selected during the multi-party call communication, displaying one or more video share keys in relation to a user; selecting one of the video share key to perform video sharing with a desired user.

When video sharing is selected during multi-party call communication, the controller displays items for selecting a user for transmitting video and user information on the display unit, and displays information corresponding to the user selected from the items and a video share key on the display unit.

The video share keys may be consistent with the number of users who want to share video. The video share key may be added or deleted. For example, the video share key may be deleted when it is moved by a certain distance to the left or right through touch-and-dragging or flicking, and may be added in one of upward and downward directions of a currently displayed video share key through menu selection.

The video share key may be set to be automatically deleted when video sharing is terminated.

If the total number of video share keys exceeds a certain number, they are automatically integrated into a single multi-video share key and displayed.

To achieve these and other advantages and in accordance with the purpose of the present invention, as embodied and broadly described herein, the present invention provides in another aspect a mobile terminal including: a memory configured to store video to be shared and a video sharing menu; a display unit configured to display items for setting a video sharing target and a video sharing authority change target from the menu; and a controller configured to perform video sharing by transmitting video to the video sharing target, and assign the authority for video sharing to the corresponding video sharing target and display a video sharing authority change key, when changing of the authority of video sharing is requested by the video sharing authority change target.

When video sharing is performed, the video sharing authority change key may be displayed only on a terminal which has been registered as a video sharing target terminal, and when changing of the authority of video sharing is requested, the video sharing authority change key may be also displayed on a terminal that performs video sharing.

When the terminal that performs video sharing approves the changing of the authority of video sharing, the video sharing authority change key displayed on the video sharing target terminal may disappear.

The video sharing authority change key displayed on the terminal that performs video sharing is set to automatically disappear when video sharing by the video sharing target terminal is terminated.

To achieve these and other advantages and in accordance with the purpose of the present invention, as embodied and broadly described herein, the present invention provides in another aspect a video sharing method of a mobile terminal, including: performing video sharing; displaying a video sharing authority change key on a screen of a first terminal that receives video when video sharing is performed; selecting the displayed video sharing authority change key to request changing of the authority of video sharing from a second terminal that provides video; and performing by the first terminal, which has acquired the authority of video sharing from the second terminal, video sharing with the second terminal.

The video sharing authority change key may be displayed only on the first terminal which has registered as a video sharing target by the second terminal. If the video sharing is multi-party video sharing, when the second terminal approves the changing of the authority of video sharing, a multi-video share key may be displayed on the first terminal.

When the second terminal approves the changing of the authority of video sharing, the video sharing authority change key may be removed from the screen to display the fact that the authority of video sharing has been acquired.

When video sharing from the first terminal to the second terminal is terminated, the video sharing authority change key may be displayed again on the screen of the first terminal to indicate that the authority of video sharing is at the second terminal.

To achieve these and other advantages and in accordance with the purpose of the present invention, as embodied and broadly described herein, the present invention provides in another aspect a video sharing method of a mobile terminal, including: selecting a menu for performing video sharing; setting a video sharing target and a video sharing authority change target from the menu; transmitting video to the set video sharing target to perform video sharing; when changing of the authority of video sharing is requested by the video sharing authority change target during video sharing, displaying a video sharing authority change key and a request message on a screen; and receiving video from the video sharing authority-requested video sharing target.

The video sharing menu may be displayed on a pop-up window and include detailed items with respect to video sharing target designation, shared video designation, authority change key setting, and video sharing authority change target setting.

When the video sharing is terminated, the video sharing authority change key may be automatically removed in order to have the authority of video sharing again.

When changing of the authority of video sharing is requested again by the video sharing authority change target, a request message may not be displayed on the screen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself. Accordingly, the 'module' and 'part' may be mixedly used.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

Figure 1:
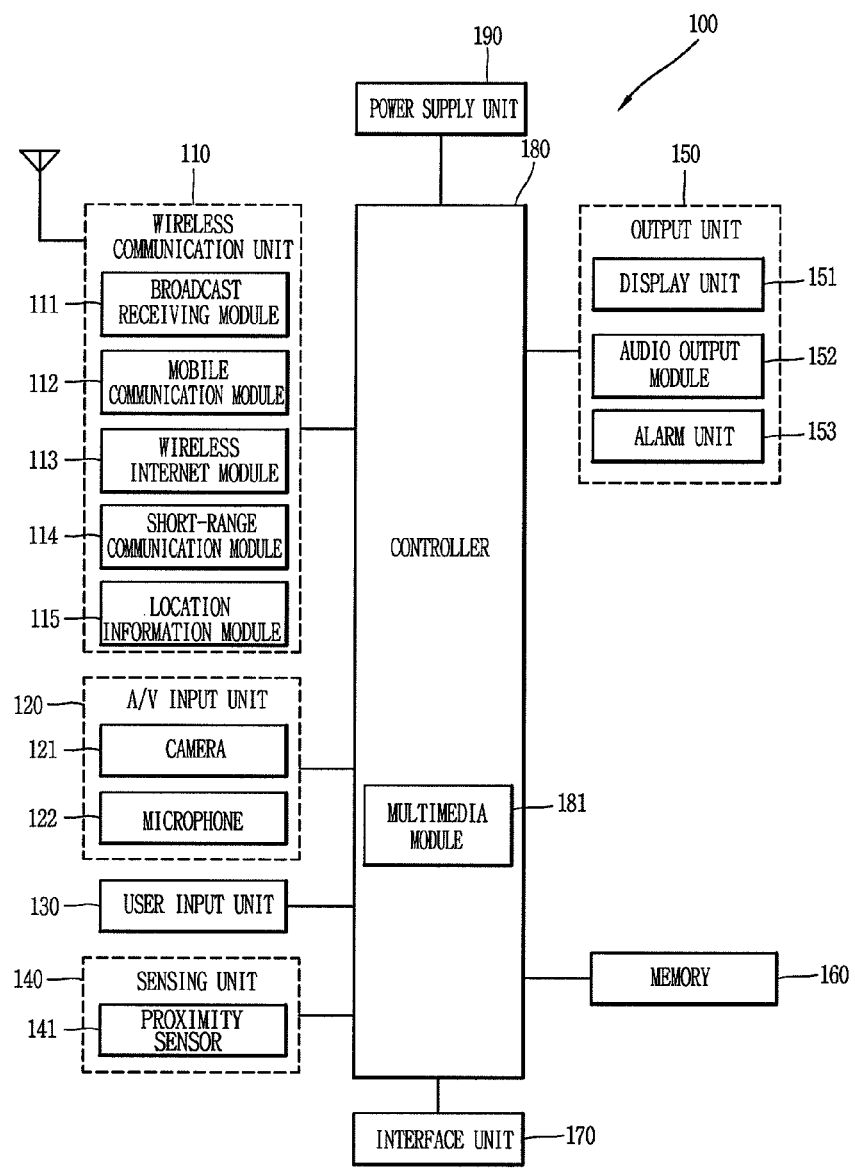
FIG. 1 is a schematic block diagram of a mobile terminal implementing an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. This will be described in relation to a touch screen later.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted. Also, the memory 160 may store data regarding various patterns of vibrations and audio signals outputted when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3. The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
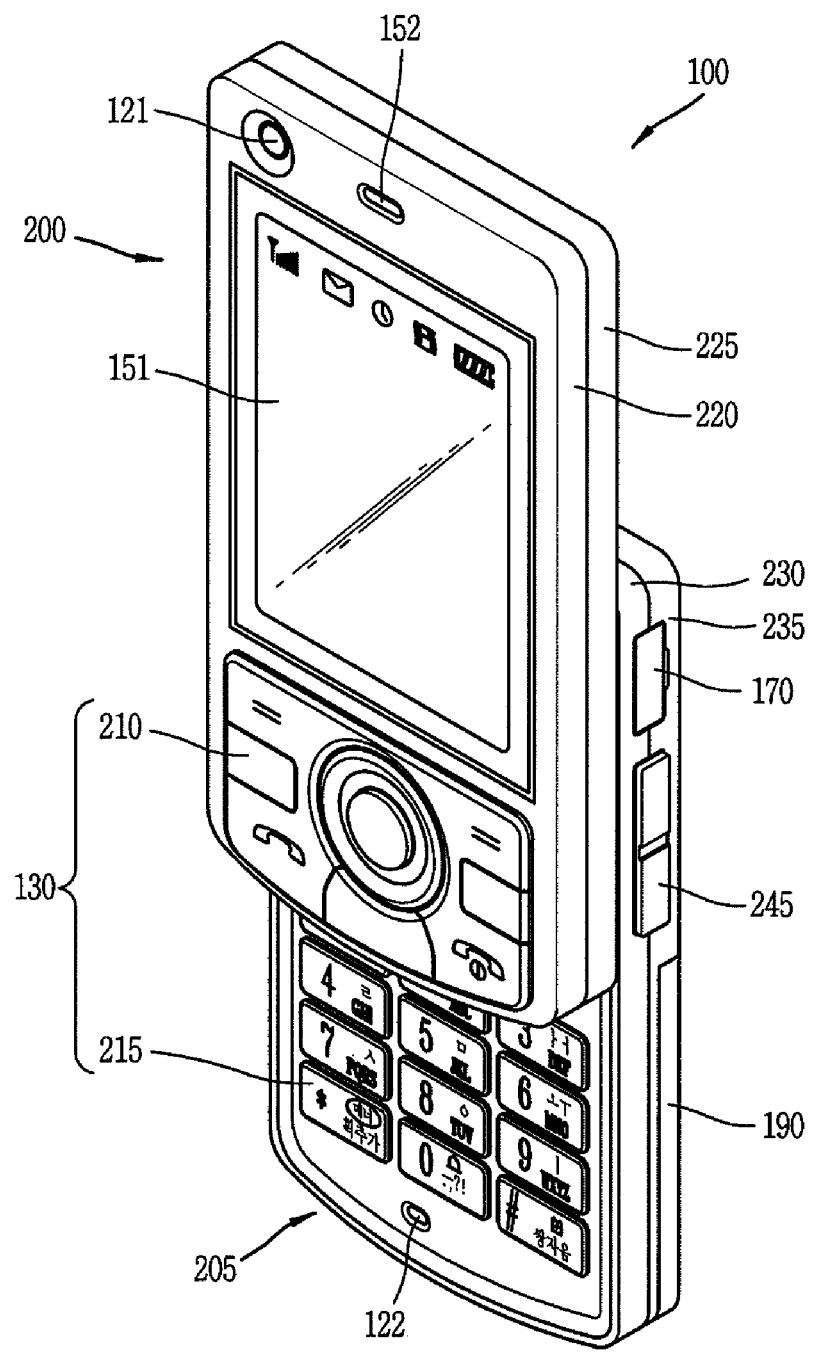
FIG. 2 is a front perspective view of a mobile terminal implementing an embodiment of the present invention.

FIG. 2 is a front perspective view of the mobile terminal according to an exemplary embodiment of the present invention.

The mobile terminal 100 according to the present invention includes a first body 200, and a second body 205 that can be slidably moved along at least one direction with respect to the first body 200. In case of a folder type mobile phone, the mobile terminal 100 may include a first body and a second body having one side that can be folded or unfolded with respect to the first body.

A state in which the first body 200 is disposed to overlap with the second body 205 may be called a closed configuration, and as shown in FIG. 2, a state in which at least a portion of the second body 205 is exposed may be called an open configuration.

Although not shown, the mobile terminal according to the present invention may be a folder type mobile terminal including a first body and a second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal can be easily known by the skilled person in the art without any explanation, so its detailed description will be omitted.

In the closed configuration, the mobile terminal 100 mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

The display unit 151, the audio output module 152, the camera 121 or the first user input unit 210 may be located at the first body 200, specifically, on the first front case 220 of the first body 200.

The display unit 151 has been described in relation to FIG. 1, so its detailed description will be omitted for the sake of brevity.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at the second body, specifically, at a front face of the second body 205.

A third user input unit 245, the microphone 122, and the interface unit 170 may be disposed on at least one of the second front case 230 and the second rear case 235.

The first to third user input units 210, 215 and 245 may be generally referred to as a manipulating portion 130, and various methods and techniques can be employed for the manipulation unit so long as they can be operated by the user in a tactile manner.

For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like. The first user input unit 210 may include a soft key used by interworking with icons displayed on the display unit 151 and navigation key (largely including four direction keys and a central key) for indicating and checking directions.

Also, the third user input unit 245 may support the so-called hot key functions that allow more convenient activation of particular functions for the mobile terminal.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. The interface unit 170 has been described in relation to FIG. 1, so its detailed description will be omitted.

The power supply unit 190 for supplying power to the terminal may be located at the second rear case 235.

The power supply unit 190 may be, for example, a rechargeable battery that can be detached.

Figure 3:
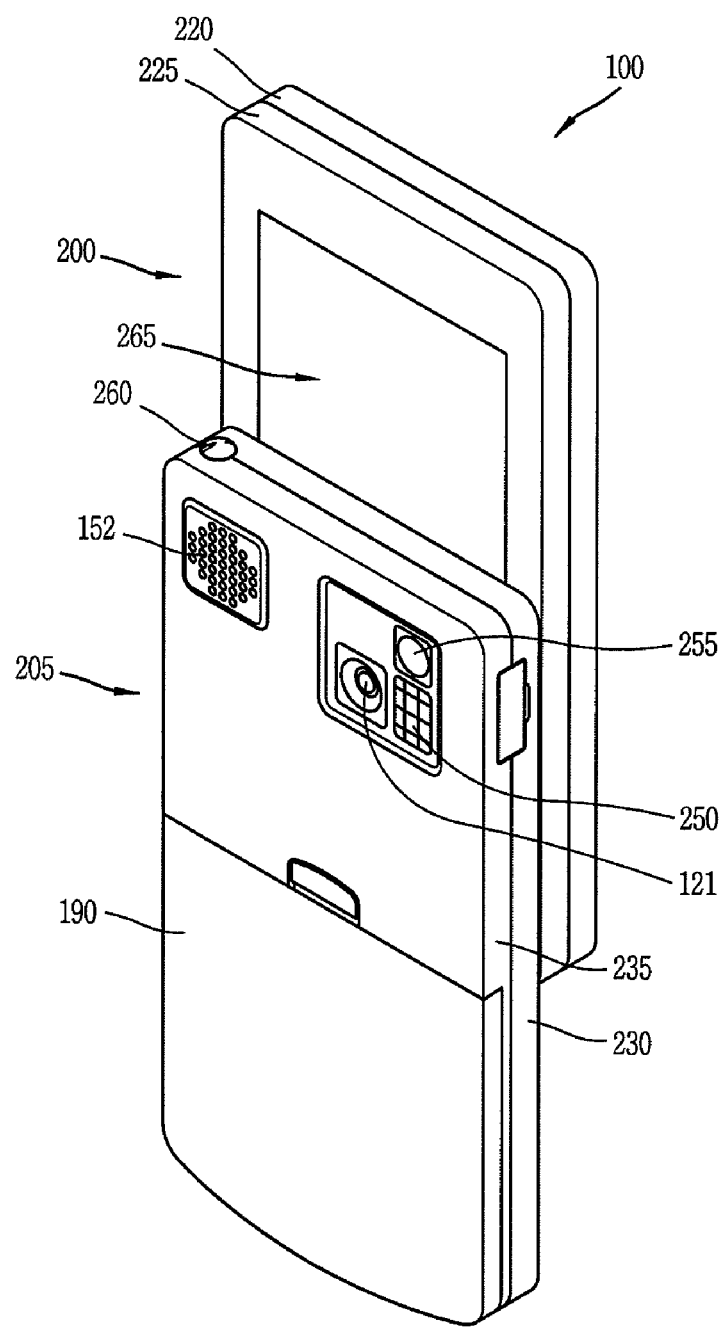
FIG. 3 is a rear perspective view of a mobile terminal implementing an embodiment of the present invention.

FIG. 3 is a rear perspective view of the mobile terminal of FIG. 2 according to an exemplary embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera of the first body 200 may operate with a relatively lower resolution to capture an image(s) of the user's face and immediately transmit such image(s) to another party in real-time during video call communication or the like in which reverse link bandwidth capabilities may be limited. Also, the camera of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152.

The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed as shown in the drawing.

The second camera 121 and other components may be disposed on the second body 205, but such configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
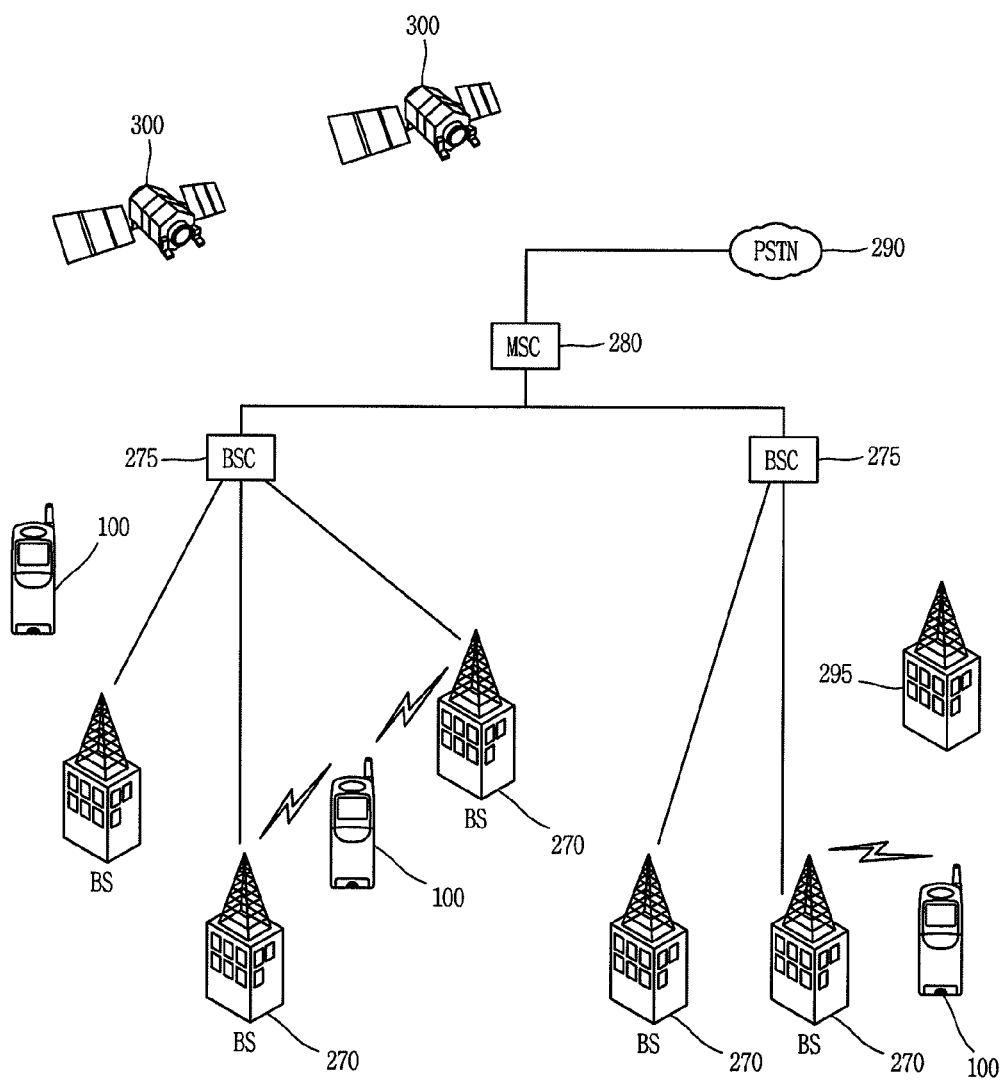
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295. In FIG. 4, several global positioning systems (GPS) satellites 300 are shown. The satellites 300 help locate at least one of a plurality of terminals 100. In FIG. 4, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

A mobile terminal provides a video sharing call (VSC) function of transmitting a previously stored image or an image (video signal) captured by a camera to a counterpart terminal in real time in a call mode in which a voice signal is transmitted or received. The user of a mobile terminal may establish a session with a counterpart user with which the mobile terminal user wants to sharing video, and shares images (i.e., video) through the established session. In this case, the user (or sender) who wants to share video will be referred to as an 'MO' and the user who receives the video will be referred to as an 'MT'.

Figure 5:
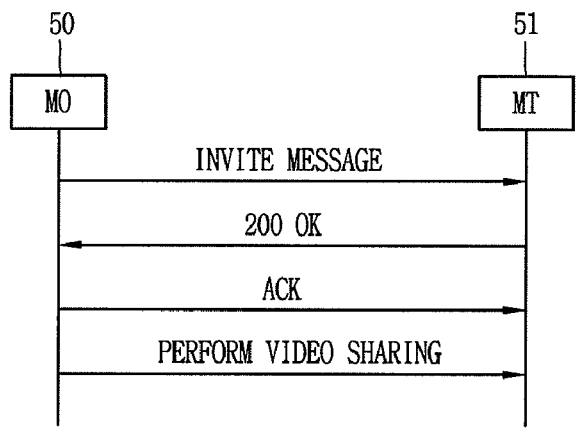
FIG. 5 is a signal flow chart for performing video sharing in one-to-one call communication according to the related art.

FIG. 5 is a signal flow chart for performing video sharing in one-to-one call communication according to the related art. In an exemplary embodiment of the present invention, video sharing in one-to-one communication will be defined as 'individual video sharing' for the sake of brevity.

As shown in FIG. 5, in order to share video, the user MO 50 transmits a session establishment request message (i.e., INVITE message) to the counterpart user MT 51. The INVITE message may include the type of the video the MO 50 may receive, a location to which the video is to be transmitted, and the like. In order to be transmitted to the MT 50, the INVITE message passes through some SIP servers (not shown) which are implemented as proxy servers having only a message transmission function.

Upon receiving the INVITE message, the SIP servers parse the INVITE message to recognize the MT 51, and transfer the INVITE message to another SIP server or to the MT 51.

Upon receiving the INVITE message, the MT 51 transmits a response message with respect to the INVITE message. The response message includes a state code indicating a processing result. If the MT 51 successfully receives and processes the INVITE message, it transmits a response message '200 OK' to the MO 50. Upon receiving the response message, the MO 50 transmits an ACK request message to the MT 51 in order to inform that the response message 200 OK has been properly received from the MT 51, thereby establishing a session between the MO 50 and the MT 51.

Then, the MO 50 transmits video, for example, previously stored video (i.e., video) or video (i.e., video signal) captured by the camera, to be shared through the established session, to the MT 51.

Figure 6:
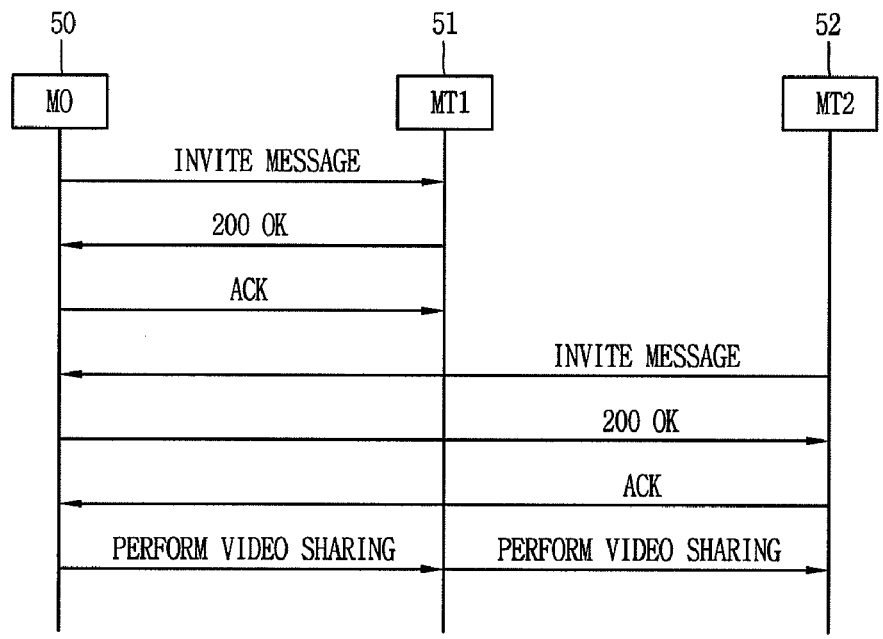
FIG. 6 is a signal flow chart for performing video sharing in one-to-many call communication according to an exemplary embodiment of the present invention.

FIG. 6 is a signal flow chart for performing video sharing in one-to-many call communication according to an exemplary embodiment of the present invention. In an exemplary embodiment of the present invention, video sharing in one-to-many communication will be called 'multi-party video sharing' for the sake of brevity.

With reference to FIG. 6, the operation in which the user MO 50 transmits a session establishment request message (i.e., INVITE message) to a user MT1 51 to establish a session is the same as that of the case illustrated in FIG. 5. The MO may perform voice call communication with the MT1 51 through the established session (e.g., a first session), and it may request session establishment from another user MT2 52 or receive a request for session establishment from the MT 52 while performing voice call communication with the MT1 51.

When an INVITE message requesting session establishment is received from the MT2 52, the MO 50 includes a processing result with respect to the INVITE message in a response message (200 OK) and transmits the same to the MT2 52. Upon receiving the response message, the MT2 52 transmits an ACK request message to the MO 50 in order to inform that the response message 200 OK has been properly received from the MO, thus establishing another session (e.g., a second session) between the MO 50 and the MT2 52.

Accordingly, the MO performs a multi-party video sharing function by transmitting previously stored video or video captured by the camera to the MT1 51 and MT2 52 through the established first and second sessions.

When a video sharing menu is selected while the MO 50 performs call communications (i.e., the individual call communication or the multi-party call communication) with multiple users in a user menu, a video share execution key (will be referred to as a 'video share key', hereinafter) along with the information about the counterpart users on the terminal screen. The user may select the video share key displayed on the screen to perform the individual video sharing or multi-party video sharing function.

Figure 7A:
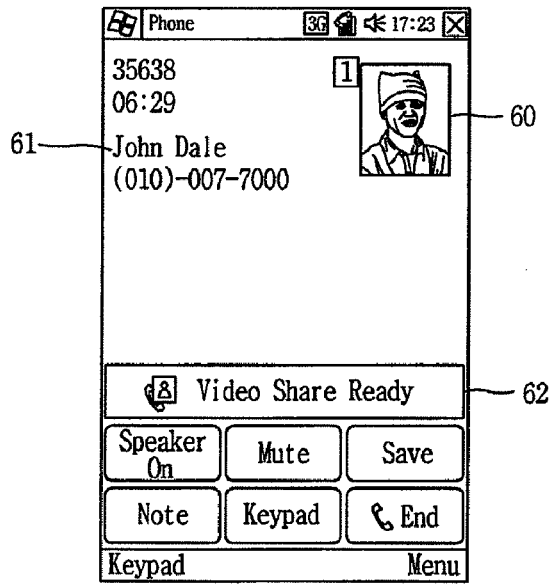
FIG. 7a is an overview of a display screen of a user terminal (MO) for performing video sharing during individual call communication.

FIG. 7a is an overview of a display screen of the user terminal (MO) for performing video sharing during individual call communication.

As shown in FIG. 7a, the user, who provides video, may perform one-to-one call communication with the user MT, who receives the video, through a particular session, and may perform individual video sharing during the one-to-one call communication. When the session is established between the MO and the MT, the controller 180 displays the information of the user MT and a single video share execution key (will be referred to as a 'video share key', hereinafter) 62 on the screen. When a key manipulation or a particular touch is detected in the individual call state, the controller 180 may display an individual video share menu on the screen of the user terminal MO. In the individual video share menu, the MO may set whether to display individual video share items, e.g., information 60 and 61 about a counterpart with which the user is to perform individual video sharing, and the video share key 62.

The information about the counterpart includes a photo image 60 (or an avatar, a list, etc.) displayed at one side of the screen and the name and a phone number 61 of the counterpart MT displayed at the other side of the screen. In FIG. 7a, the photo image 60 is displayed at the right side of the screen, and the name and phone number 61 of the counterpart MT are displayed at the left side of the screen, but their positions may be changed according to a user selection. In addition, the photo image 60, the name and phone number 61 of the counterpart are all displayed on the screen, but only one of them may be selectively displayed as necessary.

Accordingly, when the user MO selects the video share key 62 through a touch or a key selection during one-to-one call communication with the user MT, the controller 180 provides an individual video share menu on the screen. When the user selects a desired video from the displayed individual video share menu and executes video transmission, the controller 180 transmits the selected video to the user MT through the session established in FIG. 5, thus performing individual video sharing.

Figure 7B:
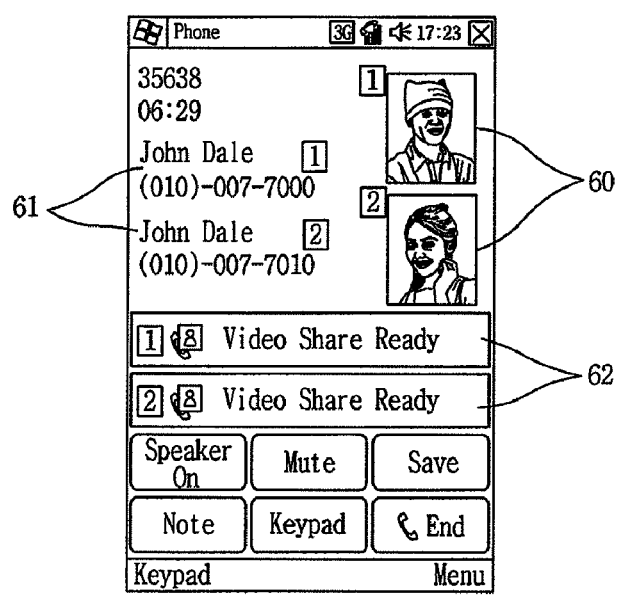
FIG. 7b is an overview of a display screen of a user terminal (MO) for performing video sharing during multi-party call communication.

FIG. 7b is an overview of a display screen of a user terminal (MO) for performing video sharing during multi-party call communication.

As shown in FIG. 7b, the user MO may select the users MT1 and MT2 from several calls to perform call communication with them and also perform multi-party video sharing function. In this case, the authority of the video sharing is at the user MO, and the information about the counterparts of the current video sharing is displayed on the screen of the terminal of the MO.

As the information about the counterparts, photo images 60 or avatars may be displayed on a right portion of the screen, and the names and phone numbers 61 of the counterparts MT1 and MT2 may be displayed on a left portion of the screen. In FIG. 7, the photo images 60, the names and phone numbers 61 of the counterparts are all displayed, but they may be selectively displayed as necessary.

Video share execution keys 62 (will be referred to as 'video share keys', hereinafter) are displayed under the photo images 60 and the names 61 of the counterparts. The number of the video share keys 62 is consistent with the number of MTs with which the MO wants to share video.

Figure 8:
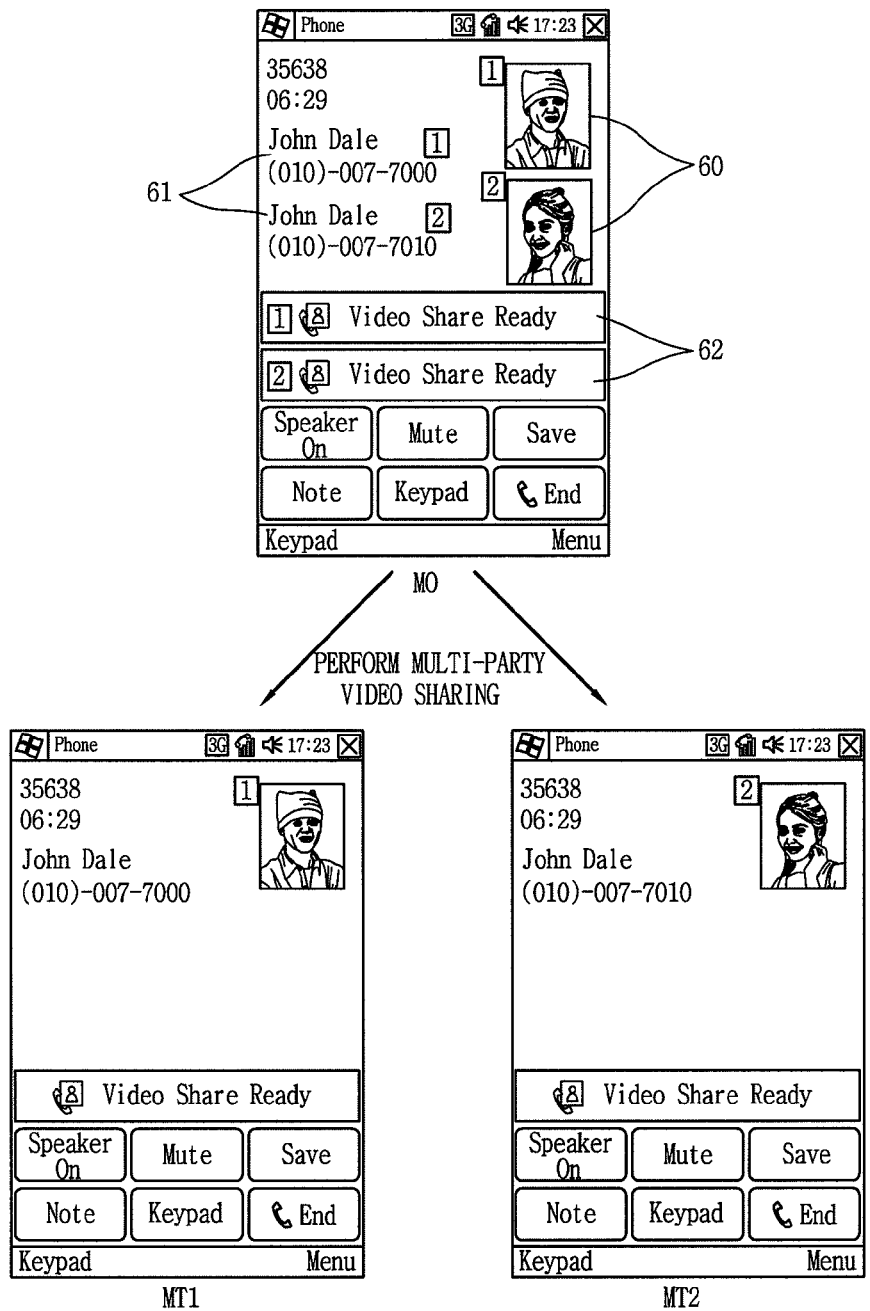
FIG. 8 is an overview of a display screen of the user terminal (MO) and user terminals (MTs) in performing video sharing in a multi-party call communication state.

FIG. 8 is an overview of a display screen of the user terminal (MO) and user terminals (MTs) in performing video sharing in a multi-party call communication state.

When a session is established between the user MO and the user MT1 and MT2, respectively, the controller 180 displays two video share keys 62 corresponding to the users MT1 and MT2 on the screen.

The number of video share keys 62 is consistent with the number of users with which the user wants to share video, but not consistent with the number of users who perform voice call communication. The reason for this is because the user MO having the authority of video sharing may transmit video only to a particular user, rather than transmitting video all of the users MT. To this end, the controller 180 provides the user with a menu for selecting a video sharing target MT and user information.

The number of the video share keys 62 may be added or deleted. When a session for voice call communication is established between the MO and the plurality of MTs, the controller 180 may generate the video share keys 62 corresponding to the session through menu setting and delete the particular video share keys 62 according to a selection of the MO user.

For example, the video share keys 62 may be set to be deleted when moved by a certain distance through touch-and-dragging or flicking. The touch-and-dragging may be the MO user's touch of the video share keys 62 desired to be deleted and then dragging them to the left or right, and the flicking may be the MO user's touch of the video share keys 62 and then flicking them to the left or right. Preferably, the touch includes an actual touch and a proximity touch.

The video share keys 62 may be added in one of upward and downward directions, or may be automatically deleted when the video sharing is terminated. In this case, the controller 180 deletes the particular video share keys 62 according to previously determined priority levels due to a space restriction of the screen.

One photo (or an avatar), the name, and the phone number are displayed on each screen of the user terminals MT1 and MT2, and one video share key is provided at a lower side. Thus, when the users MT1 and MT2 have the authority of video sharing, they perform individual (one-to-one) video sharing.

The video share keys 62 may be added basically each time a new session is established. In this respect, however, because the screen of the user terminal MO is limited in size, if the number of users who are to share video is large, like a conference call, it is not possible to display information and video share keys of all the users within a single screen.

Thus, in this case, the plurality of video share keys 62 may be integrated into a single multi-video share key. When the plurality of video share keys 62 are integrated into the single multi-video share key, information of the users MTs may be selectively displayed on the screen. For example, the user MT with which the user MO has performed first call communication may be displayed, or a pre-set user MT may be displayed according to its priority level.

One of the methods for integrating the plurality of video share keys into the single multi-video share key is using touch-and-dragging or flicking.

Figure 9A:
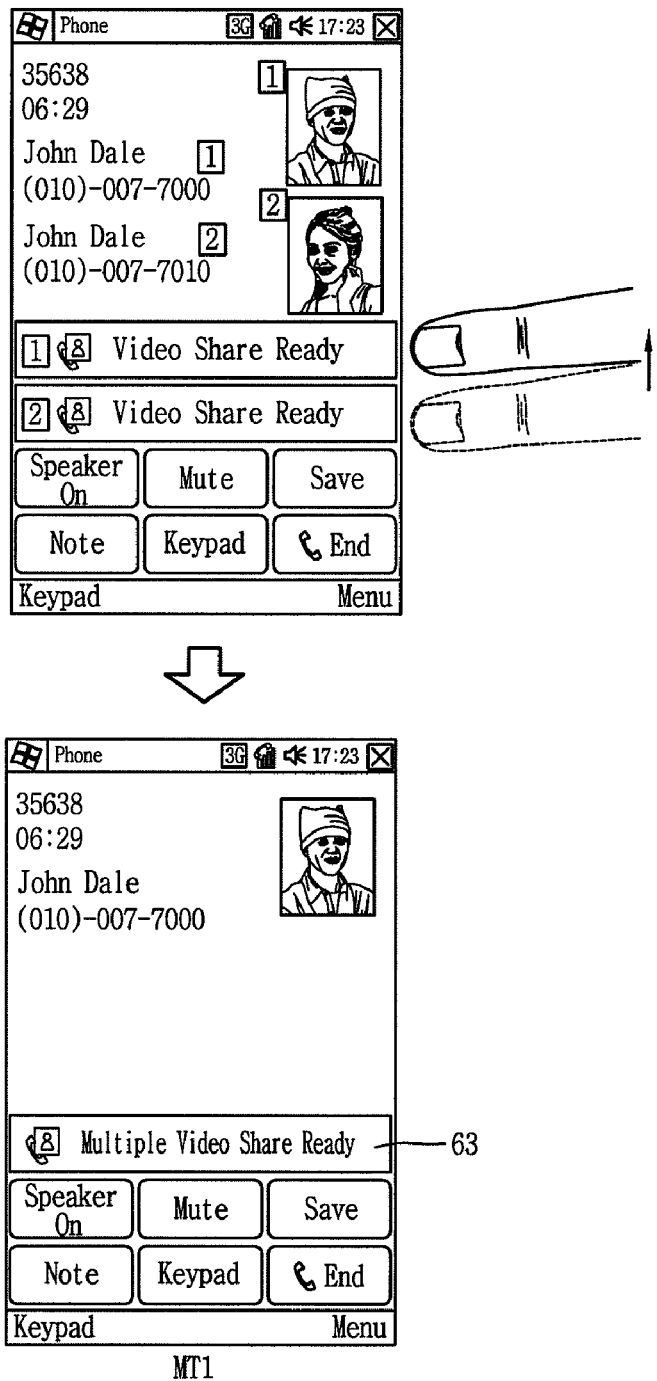
FIGS. 9a and 9b are overviews of display screens illustrating integration of a plurality of video share keys into a single multi-video share key through touch-and-dragging.
Figure 9B:
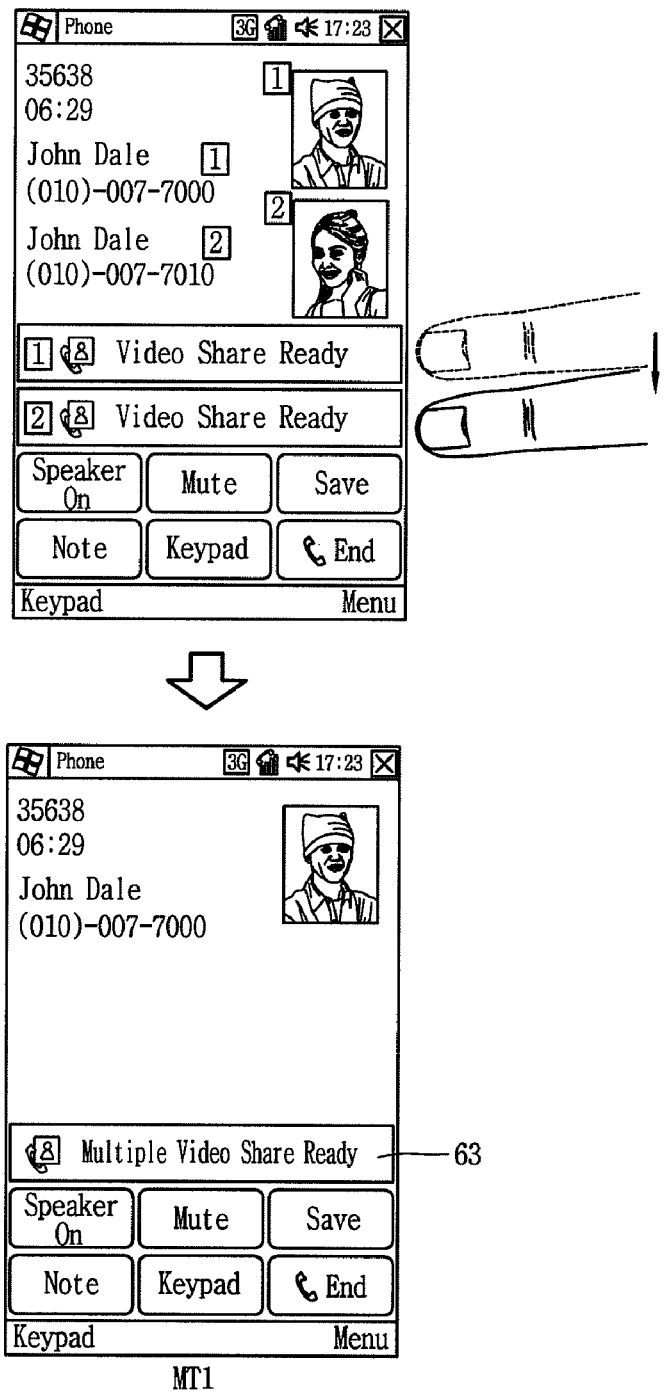

FIGS. 9a and 9b are overviews of display screens illustrating integration of a plurality of video share keys into a single multi-video share key through touch-and-dragging.

The user MO may integrate two video share keys 62 into a single multi-video share key 63 by making a single video share key 62 collide with another video share key 62 through touch-and-dragging or flicking.

Another method of integrating the plurality of video share keys into a single multi-video share key is to touch the far left and far right video share keys 62 by the user's thumb and index finger and allow the two fingers to become close to each other. This method is advantageous in that the plurality of video share keys 62 can be can be accurately integrated into the single multi-video share key 63.

Another method of integrating the plurality of video share keys into the single multi-video share key is a method of automatically integrating them by the controller 180. Because the controller 180 controls session establishment and video sharing, it can count the number of video share keys currently displayed on the screen. When a new video share key is added to exceed a predetermined certain number, the controller 180 automatically integrates the multiple vide share keys into the single multi-video share key 63 and displays it.

In addition, in an exemplary embodiment of the present invention, the a conference call proceeds from the beginning, the multi-video share key 63 is automatically displayed on the screen, and the pre-set user information MT is also displayed.

Figure 10:
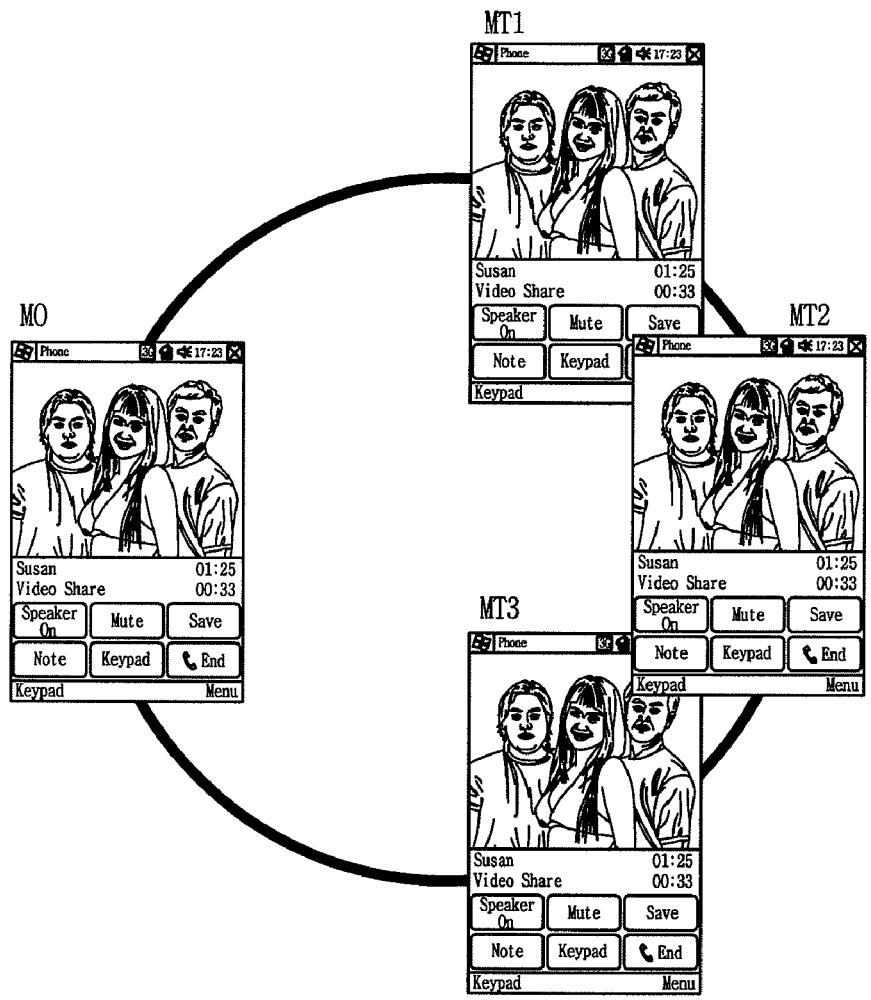
FIG. 10 is an overview of display screens illustrating performing of video sharing during multi-party call communication according to an exemplary embodiment of the present invention.

Accordingly, as shown in FIG. 10, the user MO may perform the conference call with the multiple users MT1 to MT3, and simultaneously transmits desired video to all the users MT1 to MT3 by pressing the multi-video share key 63 during the conference call.

Meanwhile, the integrated single multi-video share key 63 may be separated into the plurality of original video share keys 62 through the reverse operation of the integration.

Figure 11:
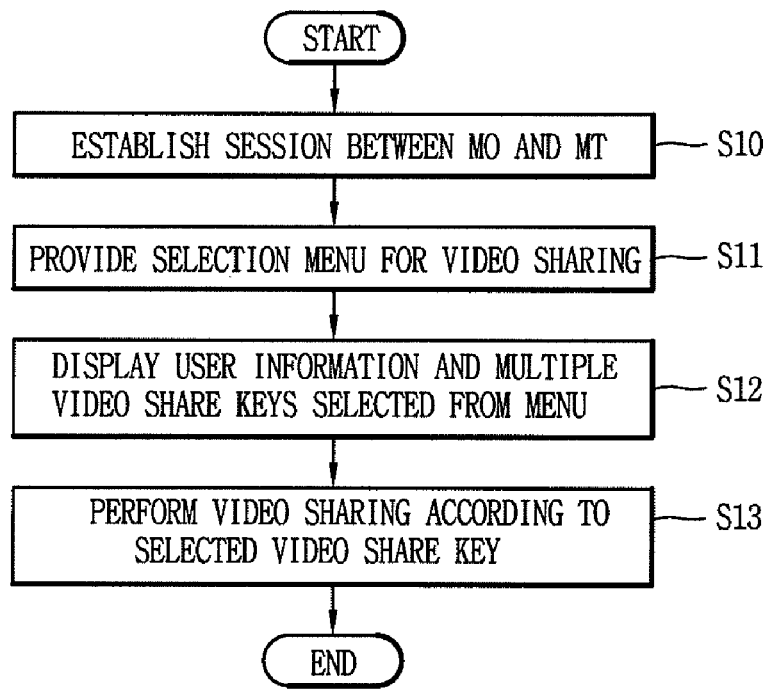
FIG. 11 is a flow chart illustrating the process of a video sharing method of a mobile terminal according to an exemplary embodiment of the present invention.

FIG. 11 is a flow chart illustrating the process of a video sharing method of a mobile terminal according to an exemplary embodiment of the present invention.

As shown in FIG. 11, the controller 180 of the user terminal MO who wants to share video transmit an INVITE message to the plurality of user terminals MTs who are to receive the video, to establish one or more sessions (S10).

Thereafter, when the user MO selects a video share menu (not shown) during the multi-party voice call communication through the established sessions, the controller 180 provides items for selecting the user MO with which the video is to be shared, and information (a photo image, an avatar, the name, a phone number, etc.) of the counterpart user to be displayed on the screen of the display unit 151 (S11). The items may be previously stored in the memory 160.

When the user MO selects a particular item from the menu, the controller 180 displays a plurality of video share keys corresponding to the selected user MO and also displays the selected user information (the photo image, the avatar, the name, the phone number, etc.) as shown in FIG. 7b (S12).

Accordingly, the user may select previously stored video or video which has been captured by the camera, and select each video share key to perform the video sharing function during the multi-party call communication with the plurality of users MTs (S13).

Figure 12:
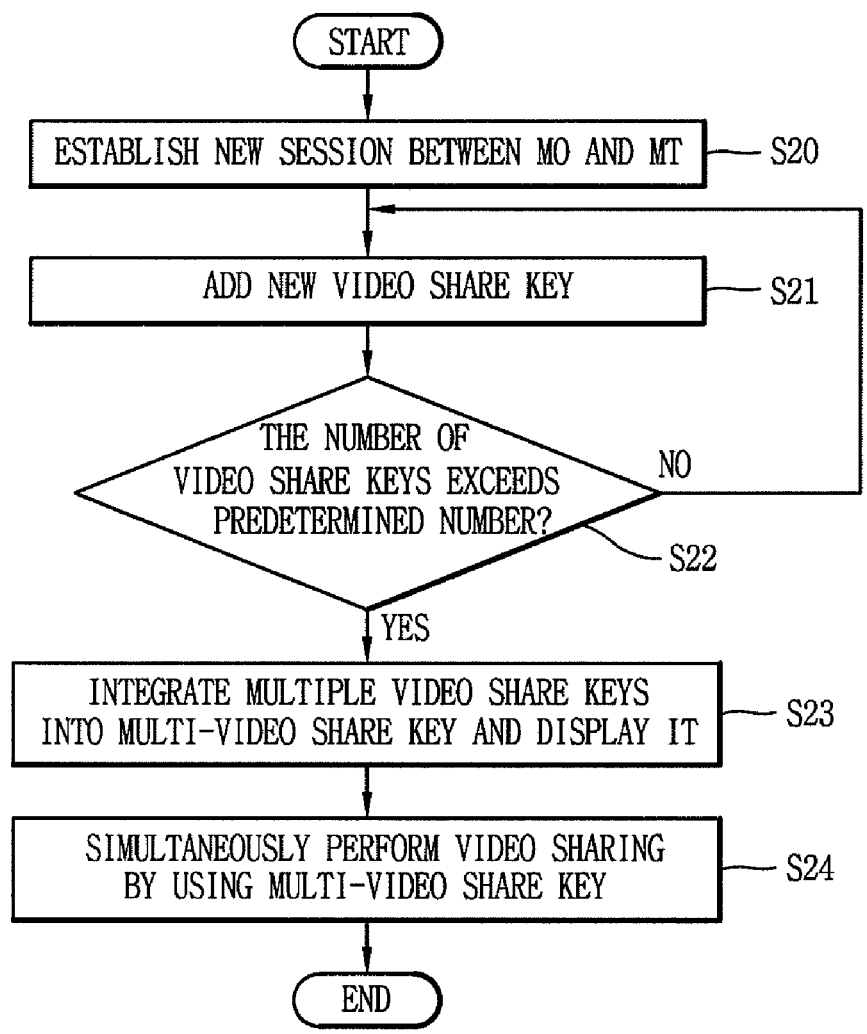
FIG. 12 is a flow chart illustrating the process of integrating a plurality of video share keys into a multi-video share key in performing a video sharing function.

FIG. 12 is a flow chart illustrating the process of integrating a plurality of video share keys into a multi-video share key in performing a video sharing function.

When a call is established with a different user MT, namely, when a new session is established between the MO and the MT (S20), the controller 180 provides the menu and adds a new video share key on the screen (S21).

With the new video share key added, if the number of currently displayed video share keys exceeds a predetermined number, the controller 180 integrates the plurality of vide share keys 62 displayed on the screen into a single multi-vide share key and displays it (S22 and S23).

Then, the user may select the previously stored video or the video captured by the camera and then select the multi-video share key 63, to simultaneously the selected video to the multiple users MTs (S24).

In this manner, in the exemplary embodiment of the present invention, when the video sharing function is preformed, the plurality of video share keys can be integrated into the single multi-video share key, and the user can simultaneously transmit desired video to the multiple users MTs at a time by manipulating the integrated multi-video share key.

Figure 13:
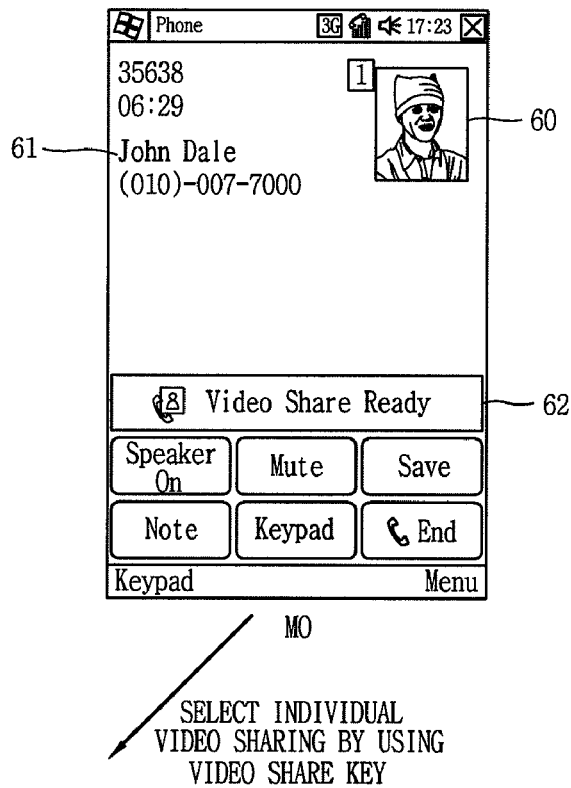
FIG. 13 is an overview of display screens illustrating performing of changing the authority of video sharing in performing individual video sharing.
Figure 13:
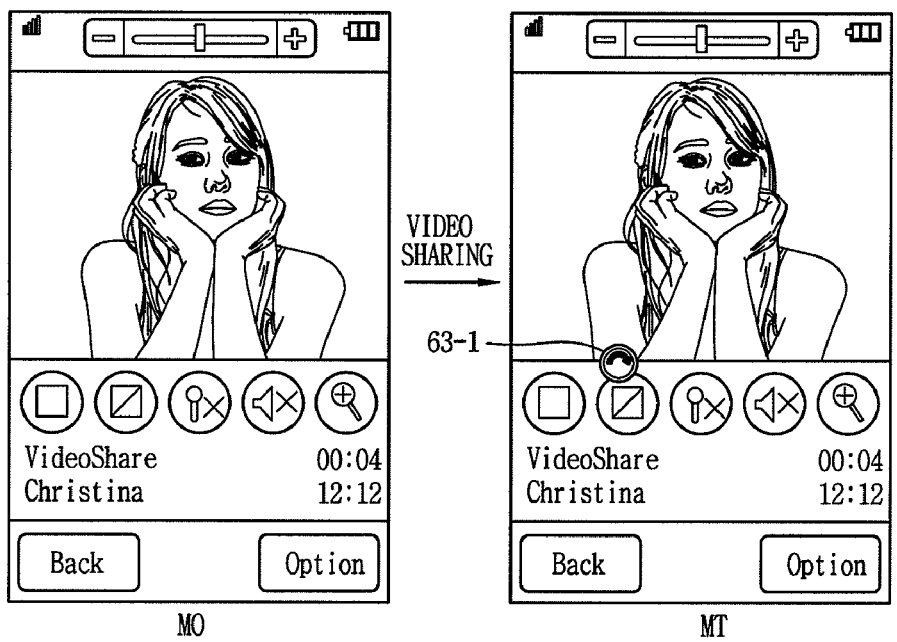

FIG. 13 is an overview of display screens illustrating performing of changing the authority of video sharing in performing individual video sharing.

As described above with reference to FIG. 7b, when individual video sharing is performed between the user MO and the counterpart user MT, video being currently transmitted is displayed on the screen of the user terminal MO having the authority of video sharing.

The video transmitted from the user MO is received by the counterpart user terminal MT via a session established between the users MO and MT. Accordingly, the video which has been transmitted by the user MO is displayed on the screen of the user terminal MT, and a video share authority change key (referred to as a 'authority change key', hereinafter) 63 is also displayed on the screen of the user terminal MT.

The authority change key 63 is displayed on the user terminal MT who receives the video in performing the individual video sharing, and displayed near user information. The user MT may request changing of the video share authority from the user MO who is currently providing the video by pressing the authority change key 63.

Figure 14:
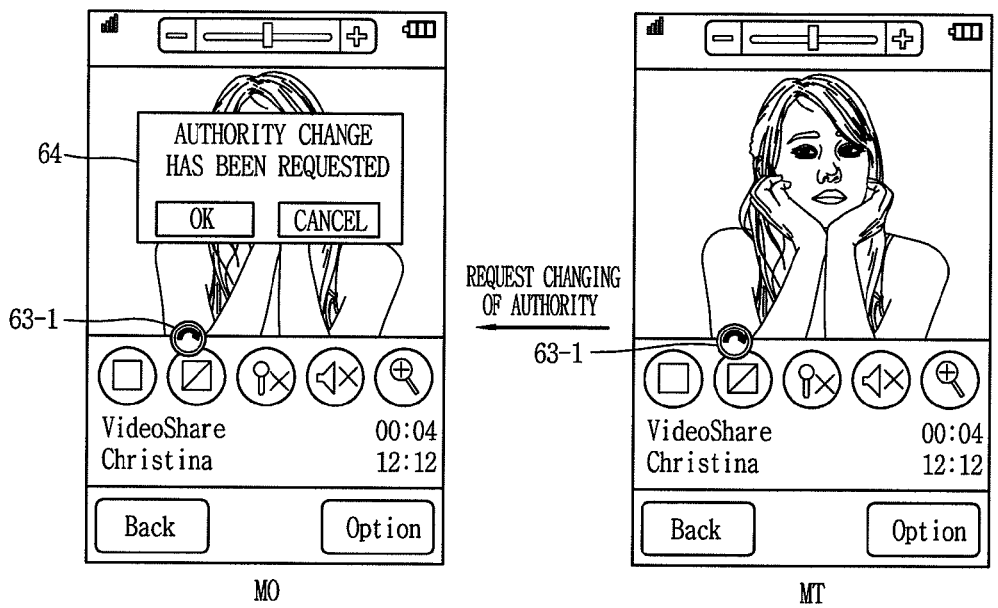
FIG. 14 is an overview of display screens illustrating changing of the authority of video sharing in performing individual video sharing.

FIG. 14 is an overview of display screens illustrating changing of the authority of video sharing in performing individual video sharing.

When video sharing is performed between the user MO and the counterpart user MT, the authority of the video sharing is at the user MO, and the authority change key 63 is displayed on the screen of the user terminal MT. Then, the user MT may select the authority change key 63 to acquire the authority of video sharing from the user MO and transmit his video to the user MO.

Namely, when the user MT selects the authority change key 63 through a touch or a voice recognition, the terminal 180 of the user terminal MT requests changing of the authority of video sharing from the user terminal MO who currently has the authority of video sharing.

When the changing of the authority of video sharing is requested by the user terminal MT, the controller 180 of the user terminal MO controls the display unit 151 to display a message requesting an approval of the authority change on the screen. And, the controller 180 displays an authority change key 63-1 at one portion of the screen not interfered with by the message to indicate that the authority is being changed.

The authority change key 63-1 is displayed at the same position on the screen of the user terminal MO as the authority change key 63 displayed on the screen of the user terminal MT. In this case, in order to distinctively indicate the fact that the authority of video sharing is currently being changed, the controller 180 may provide a special effect such as color, movement, twinkling, or rotation to the authority change key 63 and 63-1. As an example of a message requesting an authority change approval, the controller 180 may display a sentence 'authority change has been requested' on a pop-up window 64.

If the user MO selects 'OK' upon reading the message to approve the authority change, the controller 180 of the user terminal MT removes the authority change key 63 from the screen and the controller 180 of the user terminal MO removes the special effect of color, movement, twinkling, or rotation with respect to the authority change key 63-1.

Figure 15:
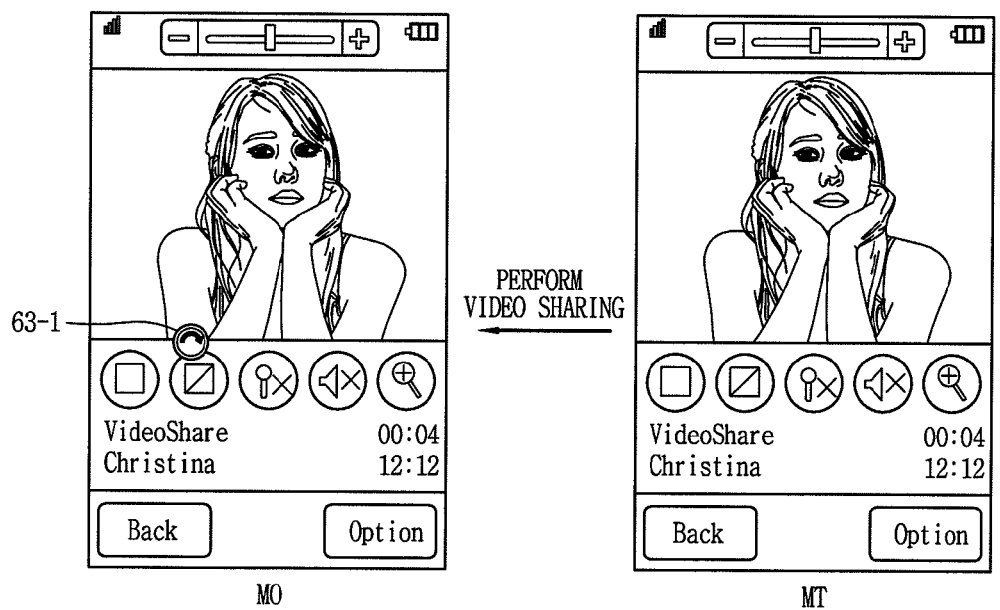
FIG. 15 is an overview of display screens illustrating performing of individual video sharing between user terminals (MT and MO) after the authority of video sharing is changed.

FIG. 15 is an overview of display screens illustrating performing of individual video sharing between user terminals (MT and MO) after the authority of video sharing is changed.

Once the authority of video sharing is changed, the authority of video sharing is at the user MT and the authority change key 63-1 is displayed on the screen of the user terminal MO. Thereafter, when the user MT selects the video share key 62 through a touch or a key selection, the controller 180 provides a video share menu related to individual video sharing on a separate screen. When the user selects desired vide from the displayed video share menu and executes video transmission, the controller 180 transmits the selected video to the user MO through an established session, thus performing individual video sharing.

When video sharing by the user MT is terminated, the user MO automatically has the authority of video sharing again. Accordingly, as shown in FIG. 13, the authority change key 63-1 disappears from the screen of the user terminal MO, and the authority change key 63 is displayed again on the screen of the user terminal MT.

Thereafter, when the user MT requests again changing of the authority of video sharing from the user MO, the controller 180 of the user terminal MT immediately has the authority of video sharing, without transmitting a message requesting an approval of the authority change to the user terminal MO. Accordingly, as shown in FIG. 15, the authority change key 63-1 is displayed on the screen of the user terminal MO during video sharing, and when the video sharing is terminated, the authority change key 63 is displayed on the screen of the user terminal MT.

Figure 16:
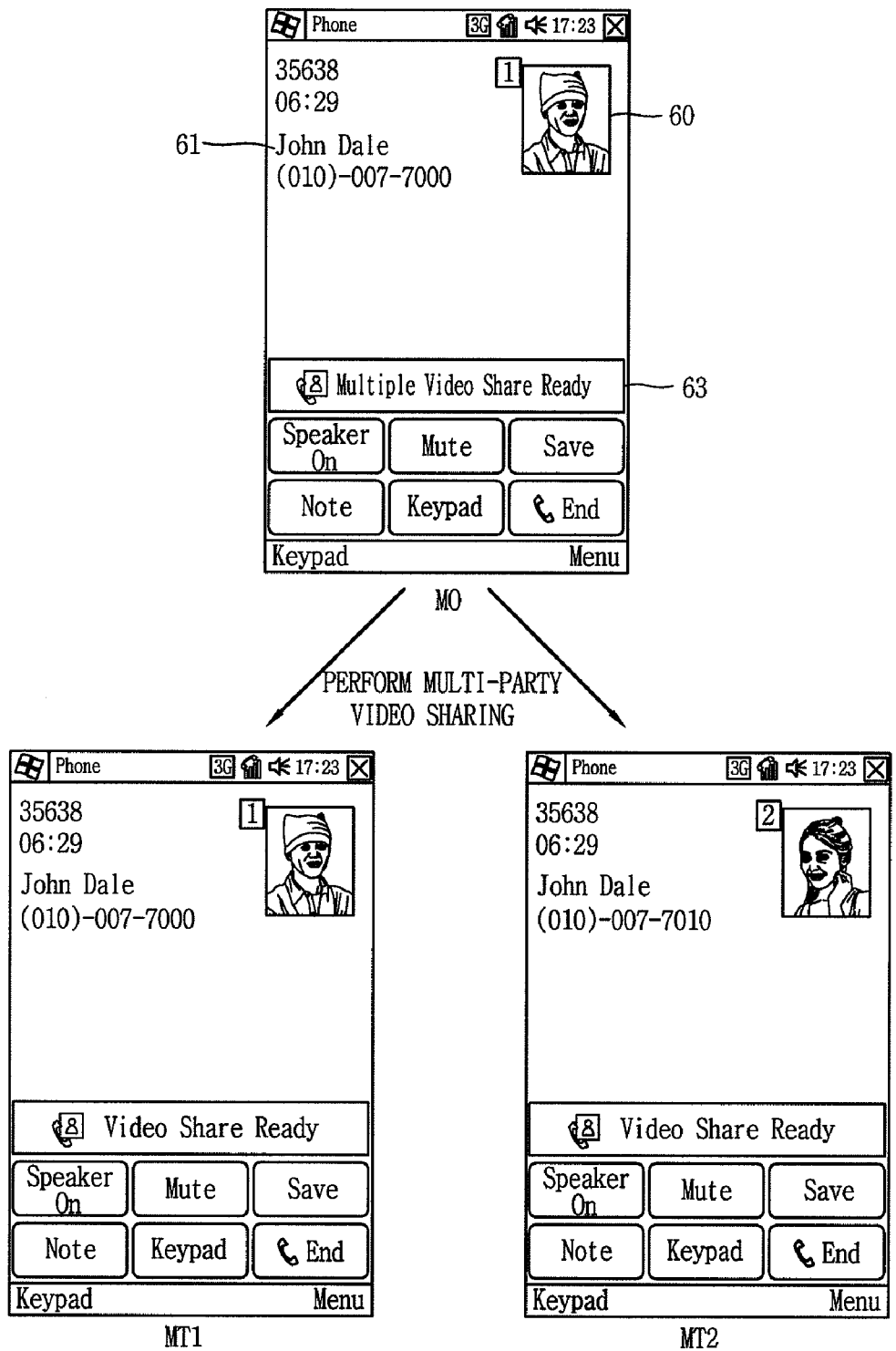
FIG. 16 is an overview of display screens illustrating performing video sharing during multi-party call communication according to an exemplary embodiment of the present invention.

FIG. 16 is an overview of display screens illustrating performing video sharing during multi-party call communication according to an exemplary embodiment of the present invention. As shown in FIG. 16, the user MO may perform multi-party call communication, namely, a conference call, with multiple users MT1 to MT3, and may select the multi-video share key during the conference call to simultaneously transmit desired video to all the users MT1 to MT3.

First, the user MO sets multi-party video sharing and performs the conference call with the users MT1 and MT2. The multi-party video sharing may be set by a multi-video sharing key (multiple video ready) by integrating video share keys (video share ready) of each session by selecting it from a menu or through a touch.

Once the multi-party video sharing is selected, information about the counterparts of the current video sharing is displayed on the screen of the user terminal MO. As the information about the counterparts, a photo image 60 (or avatar or list) may be displayed at a right portion of the screen, and names 61 or phone numbers of the counterparts MT1 and MT2 may be selectively displayed at the right portion of the screen. The counterpart information may be selectively displayed when the number of the users MT performing video sharing increases. For example, only the user MT with whom the user MO performs a first call may be displayed or a pre-set particular user MT may be displayed according to a priority level.

The multi-video share execution key 62-1 (referred to as a 'multi-video share key', hereinafter) is displayed near (at a lower portion in the present exemplary embodiment) of the photo image 60 and the name of the counterpart. The user MO performs the conference call with the multiple users MT1 to MT3 and performs multi-party video sharing with the users MT1 and MT2 by pressing the multi-video share key 62-1 during the conference call.

When the multi-video share key 62-1 is selected (through a touch or key selection), the controller 180 displays a multi-video share menu on a separate window. The multi-video sharing menu includes items of video sharing target, shared video, authority change key and chief authority setting.

Figure 17:
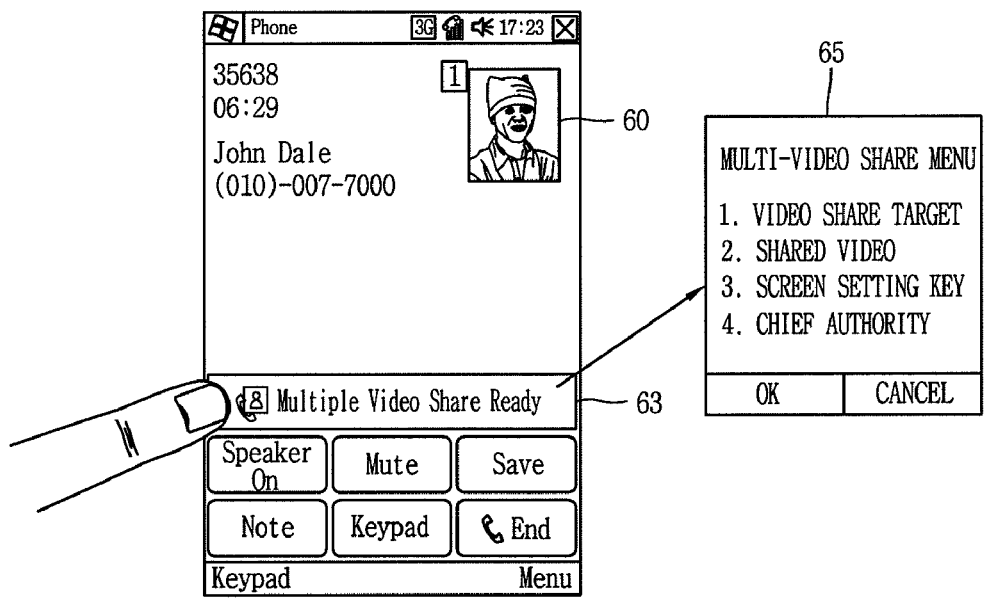
FIG. 17 is an overview of a display screen illustrating displaying of multi-video sharing menus by selecting a multi-video share key.

FIG. 17 is an overview of a display screen illustrating displaying of multi-video sharing menus by selecting a multi-video share key.

When the user MO presses the multi-video share key 62 to perform video sharing with the multiple users MT1 to MT3, the controller 180 displays the multi-video share menu including the items of video share target, the shared video, the authority change key, and the chief authority setting on the pop-up window 65.

The video share target item is an item for selecting the user MT with which the user MO intends to perform video sharing, and in this case, a user MT who is not designated as a video share target performs only voice call communication with the user MO.

Figure 18:
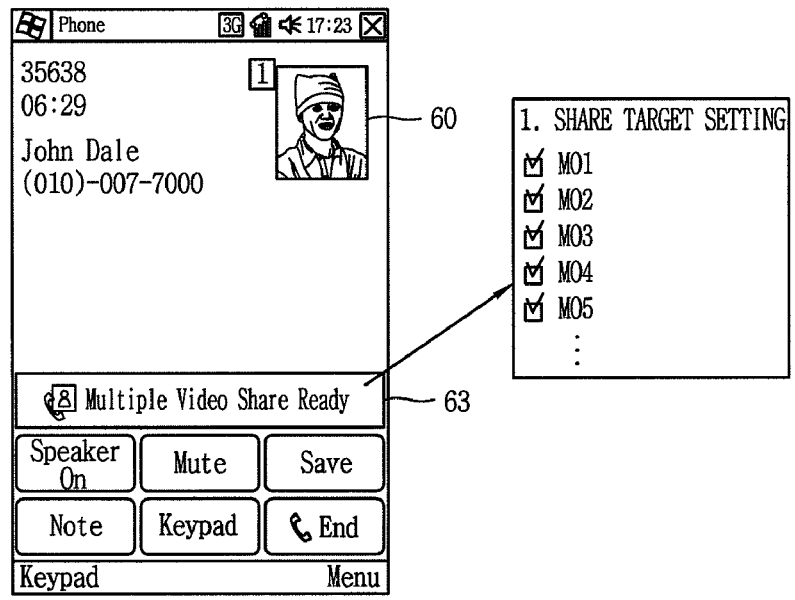
FIG. 18 is an overview of a display screen illustrating setting of some of a plurality of users as video sharing targets.

FIG. 18 is an overview of a display screen illustrating setting of some (MT1, MT2, MT4, and MT5) of a plurality of users MT1 to MT5 as video sharing targets.

The shared video item is an item for selecting video to be transmitted to the user MT, which includes captured video or video stored in the memory 160.

The authority change key item is an item for discriminating the MO and the MT by setting the special effect of a color, a movement, twinkling and rotation with respect to the authority change key displayed on the terminals of the MO and the MT, or indicating proceeding of authority change.

Figure 19:
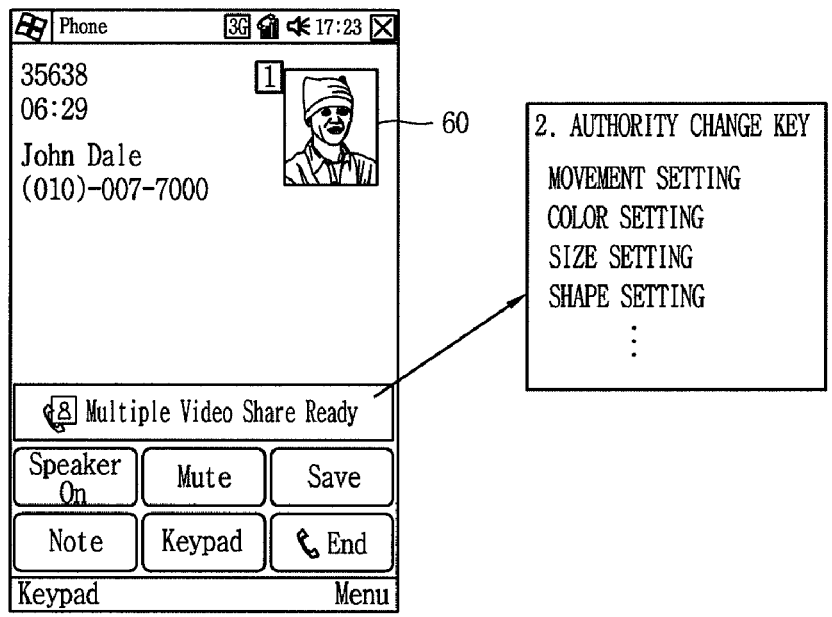
FIG. 19 is an overview of a display screen illustrating examples of items of an authority change key for setting movement, color, size, and shape.

FIG. 19 is an overview of a display screen illustrating examples of the items of the authority change key for setting movement, color, size, and shape.

The chief authority setting item is an item for setting the user MT to which the authority for video sharing is to be given. Only the user MT1 to which the authority for video sharing has been given can request changing of the authority (chief) for video sharing. Besides, the multi-video share menu may include an item for assigning the authority of video sharing to another user MT by the user MO.

Figure 20:
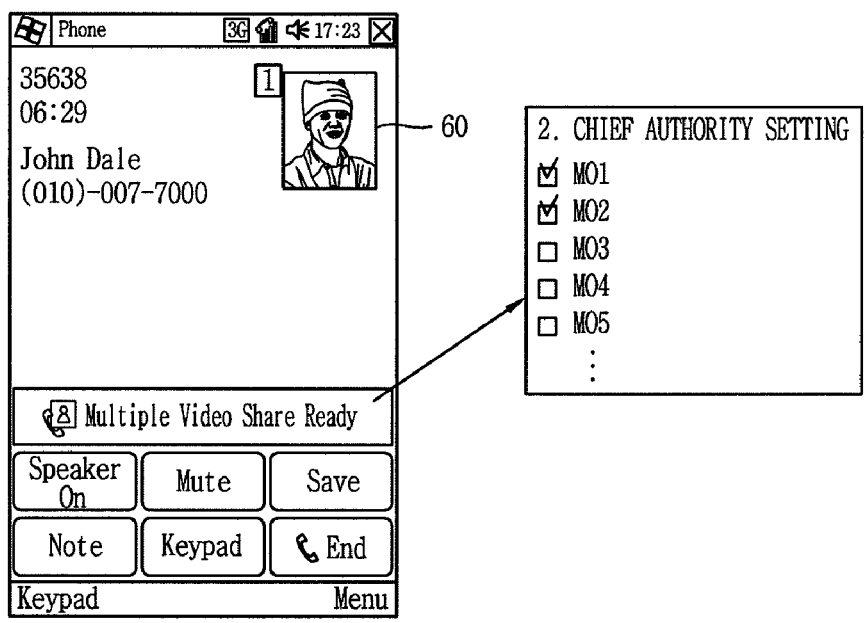
FIG. 20 is an overview of a display screen illustrating giving the authority of video sharing to some of the plurality of users.

FIG. 20 is an overview of a display screen illustrating giving the authority of video sharing to some (MT1 and MT2) among the plurality of users (MT1 to MT5). Accordingly, unless the user MO sets assigning of the authority of video sharing (chief) to a different user MT, the users MT1 and MT2 can request the user MO to change the authority of video sharing.

Figure 21:
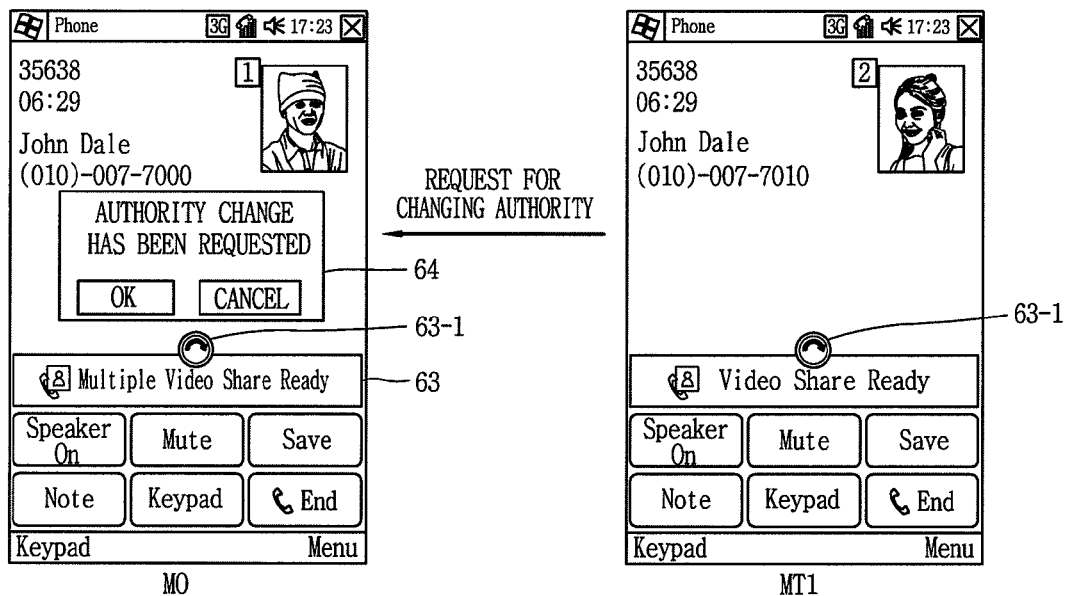
FIG. 21 is an overview of display screens illustrating changing of the authority of video sharing in performing multi-party video sharing.

FIG. 21 is an overview of display screens illustrating changing of the authority of video sharing in performing multi-party video sharing.

As shown in FIG. 21, the changing of the authority of video sharing during the multi-party call communication such as a conference call can be requested only by the users MT1 and MT2 who have given the authority of video sharing (chief). At an initial stage, the information 60 and 61 of the counterpart and the multi-video share key 62-1 are displayed on the screen of the user terminal MO having the authority of video sharing, and the authority change key 63 is displayed on the screens of the user terminals MT1 and MT2.

Accordingly, the users MT1 and MT2 may select the authority change key 63 to acquire the authority of video sharing from the user MO and transmit their selected video to the user MO.

The operation in which the user MT1 acquires the authority of video sharing from the user MO and performs video sharing will now be described.

When the user MT1 selects the authority change key 63 through a touch or voice recognition, the controller 180 of the user terminal MT1 requests changing of the authority of video sharing from the user terminal MO currently having the authority of video sharing (chief).

Upon receiving the change of the authority of video sharing from the user terminal MT1, the controller 180 of the user terminal MO controls the display unit 151 to display a message requesting an approval of the authority change on a separate pop-up window 64 and display the authority change key 63-1 at one portion of the screen.

The authority change key 63-1 displayed on the user terminal MO is displayed on the same position as that of the authority change key 63 displayed on the screen of the user terminal MT1. In this case, in order to distinctively indicate the fact that the authority of video sharing is currently being changed, the controller 180 may provide a special effect such as color, movement, twinkling, or rotation to the authority change key 63 and 63-1. As an example of a message requesting an approval of the authority change, the controller 180 may display a sentence 'authority change has been requested' on a pop-up window 64.

Figure 22:
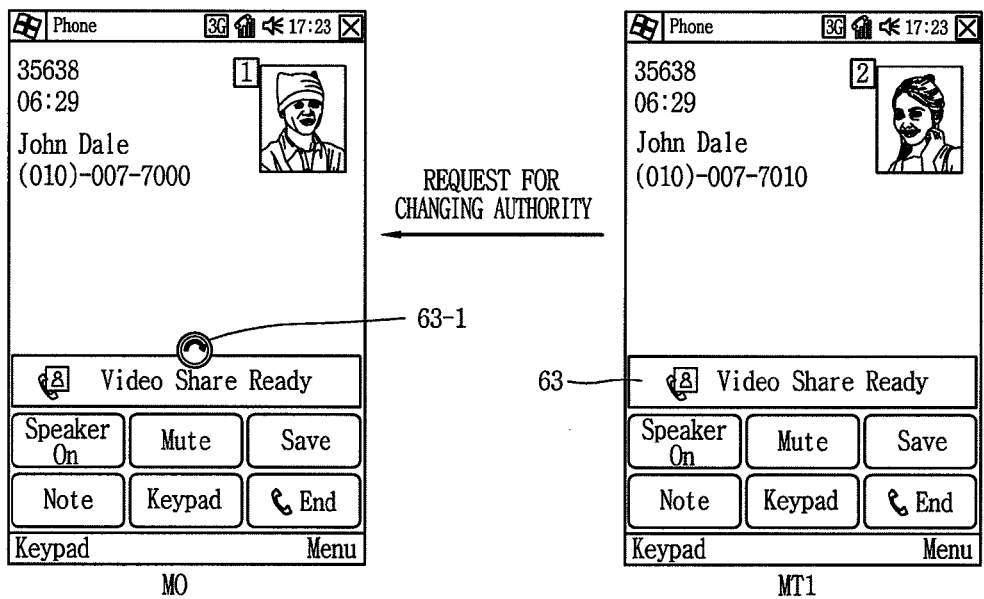
FIG. 22 is an overview of display screens of a plurality of user terminals after changing of the authority of video sharing.

When the user MO selects 'OK' upon reading the message to approve the authority change, the controller 180 of the user terminal MT1 displays the multi-video share key 62-1 on the screen, removes the authority change key 63 from the screen and the controller 180 of the user terminal MO removes the special effect of color, movement, twinkling, or rotation with respect to the authority change key 63-1. FIG. 22 is an overview of the display screens of the plurality of user terminals MO and MT1 after changing of the authority of video sharing.

Thereafter, when the user MT1 who has acquired the authority of video sharing selects the multi-video share key 62-1 through a touch or a key selection, the controller 180 provides a multi-video share menu related to individual video sharing on a separate screen. When the user selects desired vide from the displayed multi-video share menu and executes video transmission, the controller 180 transmits the selected video to the user MO through an established session.

When video sharing by the user MT is terminated, the user MO automatically has the authority of video sharing again.

Thereafter, when the user MT1 requests again changing of the authority of video sharing from the user MO, the controller 180 of the user terminal MT1 immediately has the authority of video sharing, without transmitting a message requesting an approval of the authority change to the user terminal MO. Accordingly, the authority change key 63-1 is displayed on the screen of the user terminal MO during video sharing, and when the video sharing is terminated, the authority change key 63 is displayed on the screen of the user terminal MT1.

Figure 23:
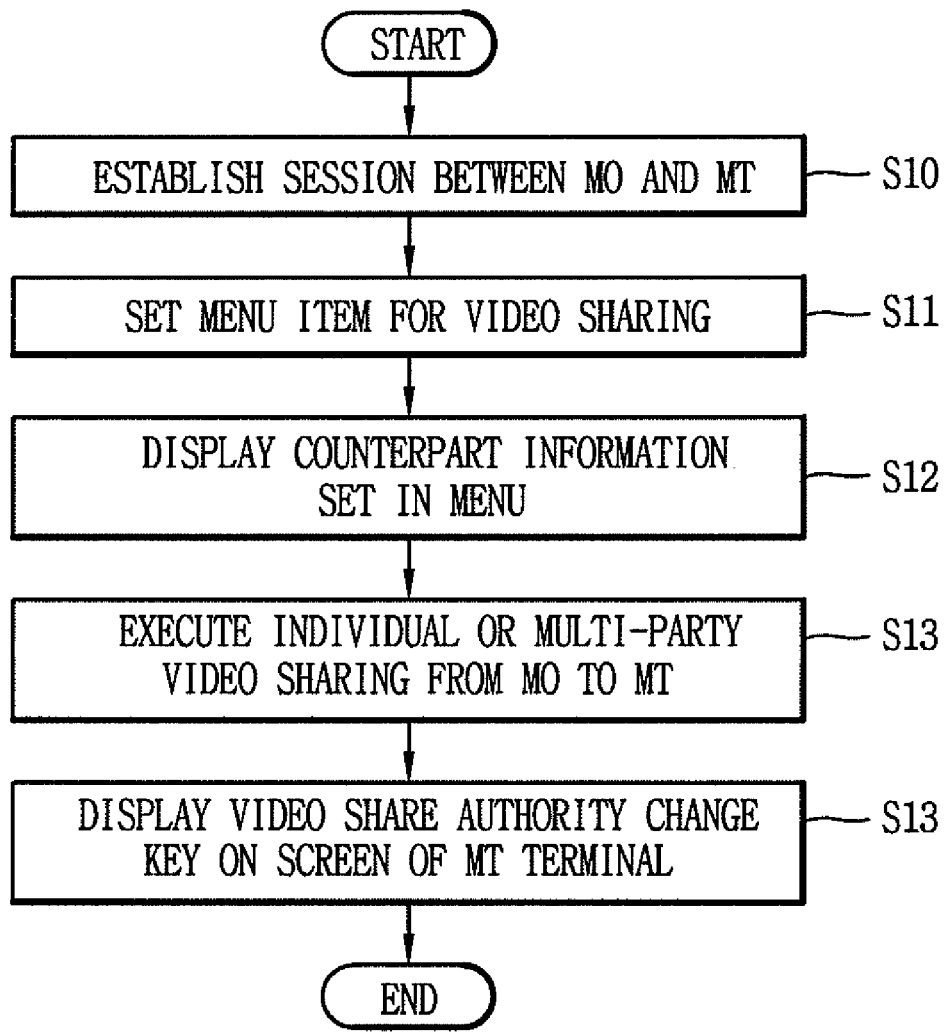
FIG. 23 is a flow chart illustrating the process of a video sharing method of a mobile terminal according to an exemplary embodiment of the present invention.

FIG. 23 is a flow chart illustrating the process of a video sharing method of a mobile terminal according to an exemplary embodiment of the present invention.

As shown in FIG. 23, the controller 180 of the user terminal MO transmits an INVITE message to the user terminal MT who is to receive video to establish a session (S10). The user terminal MT may be one or more terminals in case of multi-party video sharing.

Thereafter, when the user selects the video share key or the multi-video share key during individual or multi-party video call communication through the established session, the user displays an individual video share menu or a multi-video share menu. In the individual video share menu or the multi-video share menu, the user terminal MO displays the individual video share items or multi-video share items as described above.

When the user MO selects a desired item from the individual video share items or the multi-video share items (S11), the controller 180 displays information (a photo image, an avatar, the name, a phone number, a list, etc.) of the selected counterpart user MT on the screen.

Then, the user MO transmits previously stored video or video captured by the camera selected from the menu to the user MT to perform an individual video sharing or multi-party video sharing function (S13). While the individual video sharing or multi-party video sharing is performed, the video share authority change key is displayed on the screen of the user terminal MT (S14).

Figure 24:
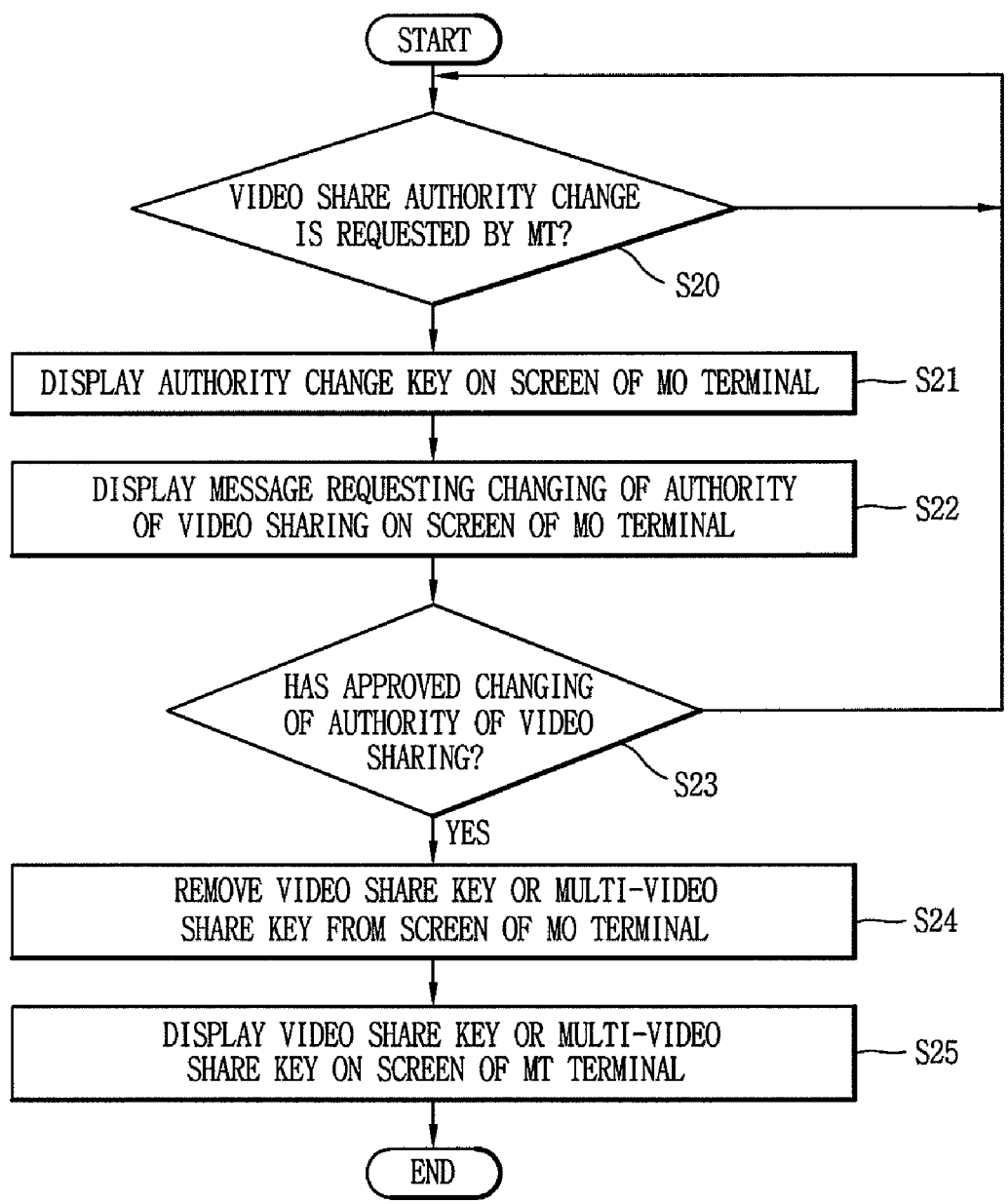
FIG. 24 is a flow chart illustrating the process of changing the authority of video sharing in real time in performing video sharing in FIG. 23.

FIG. 24 is a flow chart illustrating the process of changing the authority of video sharing in real time in performing video sharing in FIG. 23.

When the user MT selects the authority change key 63 through a touch or voice recognition, the controller 180 of the user terminal MT requests changing of the authority of video sharing from the user terminal MO currently having the authority of video sharing (chief).

When the changing of the authority of video sharing is requested by the user terminal MT1 (S20), the controller 180 of the user terminal MO controls the display unit 151 to display the authority change key 63-1 at one portion of the screen and display a message requesting the approval of changing of the authority of video sharing a pop-up window 64 (S21 and S22).

The authority change key 63-1 displayed on the user terminal MO is at the same position as that of the authority change key 63 displayed on the user terminal MT1. In this case, in order to indicate that the authority of video sharing is currently being changed or in order to discriminate the authority change keys displayed on the user terminals MO and MT, the controller 180 may provide a special effect of a color, a movement, twinkling, and rotation to the authority change keys 63 and 63-1. And the controller 180 may display a sentence 'authority change has been requested' as a message requesting an authority change approval. Upon reading the message, the user MO selects 'OK' to select an approval of the authority change.

When the user approves the change of the authority of video sharing (S23), the controller 180 of the user terminal MT removes the authority change key 63 which has been displayed on the screen and displays the video share key 52 or the multi-video share key 62-1 (S24 and S25), and the controller 180 of the user terminal MO removes the special effect of the color, the movement, the twinkling, and the rotation with respect to the authority change key 63-1.

In this manner, in the exemplary embodiment of the present invention, the authority of video sharing can be changed in real time between the two terminals while maintaining the session in performing individual or multi-party video sharing during the multi-party call communication as well as during one-to-one call communication to provide a stable and effective video sharing function for user convenience.

In an exemplary embodiment of the present invention, the above-described method can be implemented as software codes that can be read by a computer in a program-recorded medium. The computer-readable medium may include various types of recording devices in which data that can be read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). In addition, the computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A video sharing method of a mobile terminal, the method comprising:
performing, by the mobile terminal, a multi-party call communication with a plurality of users;
displaying, by the mobile terminal, a video share key in relation to the plurality of users when a video sharing of a video is selected during the multi-party call communication; and
performing, by the mobile terminal, the video sharing with at least one of the plurality of users using the video share key,
wherein the video share key includes one or more individual video share keys or a single multi-video share key, and
wherein the one or more individual video share keys are automatically integrated into the single multi-video share key when a number of users who are available to share the video exceeds a certain number.

2. The method of claim 1, further comprising:
when a video sharing menu is selected during the multi-party call communication, displaying a menu for setting a target for the video sharing and user information.

3. The method of claim 1, wherein a number of the one or more individual video share keys is consistent with the number of users who are available to share the video.

4. The method of claim 1, wherein the one or more individual video share keys are added or deleted.

5. The method of claim 4, wherein the one or more individual video share keys are deleted when the one or more individual video share keys are moved by a certain distance to the left or right through touch-and-dragging or flicking.

6. The method of claim 4, wherein the one or more individual video share keys are added in one of an upward or downward direction of the displayed video share key through a menu selection.

7. The method of claim 1, wherein the one or more individual video share keys are set to be automatically deleted when the video sharing is terminated.

8. The method of claim 1, wherein the one or more individual video share keys are integrated into the single multi-video share key through user's touch-and-dragging or flicking.

9. A mobile terminal, comprising:
a memory configured to store information in relation to a video sharing of a video;
a display unit configured to display information in relation to the video sharing and a video shared state; and
a controller configured to
display a video share key in relation to a plurality of users when the video sharing is performed during a multi-party call communication, and
perform the video sharing with at least one of the plurality of users using the video share key,
wherein the video share key includes one or more individual video share keys or a single multi-video share key, and wherein the one or more individual video share keys are automatically integrated into the single multi-video share key when a number of users who are available to share the video exceeds a certain number.

10. The mobile terminal of claim 9, wherein when the video sharing is selected during the multi-party call communication, the controller displays items for selecting a user for transmitting video and user information on the display unit, and displays information corresponding to the user selected from the items and the video share key on the display unit.

11. The mobile terminal of claim 9, wherein a number of the one or more individual video share keys is consistent with the number of users who are available to share video, and the one or more individual video keys can be added or deleted.

12. The mobile terminal of claim 11, wherein the one or more individual video share keys are deleted when the one or more individual video share keys are moved by a certain distance to the left or right through touch-and-dragging or flicking.

13. The mobile terminal of claim 11, wherein the one or more individual video share keys are added in one of upward and downward directions of the displayed video share key through a menu selection.

14. The mobile terminal of claim 9, wherein the one or more individual video share keys are set to be automatically deleted when the video sharing is terminated.

15. The mobile terminal of claim 9, wherein the one or more individual video share keys are integrated into a single multi-video share key through a user's touch-and dragging or flicking.

16. A video sharing method of a mobile terminal, the method comprising:
    performing, by the mobile terminal, a multi-party call communication with a plurality of terminals;
    displaying, by the mobile terminal, a video share key in relation to the plurality of terminals on the mobile terminal when a video sharing of a first video is selected during the multi-party call communication;
    performing, by the mobile terminal, the video sharing of the first video with at least one of the plurality of terminals using the video share key;
    registering, by the mobile terminal, one of the plurality of terminals as a video share target by the mobile terminal so that a video sharing authority change key is displayed only on a screen of the one of the plurality of terminals;
    receiving, by the mobile terminal, a video sharing authority change request from the one of the plurality of terminals and displaying the video sharing authority change key on a screen of the mobile terminal while the video sharing authority change key is displayed on the screen of the one of the plurality of terminals; and
    changing, by the mobile terminal, a video sharing authority from the mobile terminal to the one of the plurality of terminals according to the video sharing authority change request,
    wherein, after the video sharing authority is changed from the mobile terminal to the one of the plurality of terminals, the video sharing authority change key remains on the screen of the mobile terminal but the video sharing authority change key is no longer displayed on the screen of the one of the plurality of terminals.

17. The method of claim 16, wherein the video share authority change key is displayed in a vicinity of a position where counterpart information is displayed on the screen of the mobile terminal.

18. The method of claim 16, further comprising:
    controlling a key display characteristic of the video share authority change key displayed on the screen of the mobile terminal to indicate that the video sharing authority is changed from the mobile terminal to the one of the plurality of terminals.

19. The method of claim 18, wherein the key display characteristic comprises one of a color, a movement, twinkling, and a rotation of the video share authority change key.

20. The method of claim 16, further comprising:
    when the mobile terminal approves changing the video sharing authority, removing the video share authority change key from the screen of the one of the plurality of terminals to indicate that the video sharing authority has been acquired by the one of the plurality of terminals
    performing a video sharing of a second video from the one of the plurality of terminals to the mobile terminal; and
    when the video sharing of the second video is terminated, redisplaying the video share authority change key on the screen of the one of the plurality of terminals to indicate that the authority of video sharing has returned to the mobile terminal.

21. The method of claim 20, further comprising:
    if the video sharing of the second video is a second multi-party video sharing and when the mobile terminal approves changing of the video sharing authority to the one of the plurality of terminals, displaying a corresponding multi-video share key on another of the plurality of terminals.

22. A mobile terminal, comprising:
    a memory;
    a display unit; and
    a controller operatively connected to the memory and the display unit, the controller configured to
        perform a multi-party call communication with a plurality of terminals,
        display a video share key in relation to the plurality of terminals on the mobile terminal when a video sharing of a first video is selected during the multi-party call communication,
        perform the video sharing of the first video with at least one of the plurality of terminals using the video share key,
        register one of the plurality of terminals as a video share target by the mobile terminal so that a video sharing authority change key is displayed only on a screen of the one of the plurality of terminals,
        receive a video sharing authority change request from the one of the plurality of terminals and display the video sharing authority change key while the video sharing authority change key is displayed on the screen of the one of the plurality of terminals, and
        change a video sharing authority from the mobile terminal to the one of the plurality of terminals according to the video sharing authority change request,
        wherein, after the video sharing authority is changed from the mobile terminal to the one of the plurality of terminals, the video sharing authority change key remains displayed on the mobile terminal but the video sharing authority change key is no longer displayed on the screen of the one of the plurality of terminals.

* * * * *